(12) United States Patent
Katayose et al.

(10) Patent No.: US 8,427,757 B2
(45) Date of Patent: Apr. 23, 2013

(54) IMAGE PICKUP APPARATUS

(75) Inventors: Masato Katayose, Hachioji (JP); Kenji Ono, Fussa (JP)

(73) Assignee: Olympus Imaging Corp., Tokyo (JP)

( * ) Notice: Subject to any disclaimer, the term of this patent is extended or adjusted under 35 U.S.C. 154(b) by 75 days.

(21) Appl. No.: 13/199,822

(22) Filed: Sep. 8, 2011

(65) Prior Publication Data

US 2012/0075494 A1 Mar. 29, 2012

(30) Foreign Application Priority Data

Sep. 14, 2010 (JP) ................. 2010-205755

(51) Int. Cl.
G02B 15/14 (2006.01)

(52) U.S. Cl.
USPC .......................................... 359/686; 359/687

(58) Field of Classification Search .............. 359/676, 359/683, 686, 687, 726
See application file for complete search history.

(56) References Cited

U.S. PATENT DOCUMENTS

| 7,068,440 B1 * | 6/2006 | Nakatani et al. ............. 359/676 |
| 7,593,168 B2 | 9/2009 | Shirota |
| 7,746,562 B2 | 6/2010 | Katakura |
| 7,864,443 B2 | 1/2011 | Sudoh et al. |

FOREIGN PATENT DOCUMENTS

| JP | 2008-129238 | 6/2008 |
| JP | 2009-198719 | 9/2009 |
| JP | 2009-236973 | 10/2009 |

* cited by examiner

Primary Examiner — William Choi

(74) Attorney, Agent, or Firm — Kenyon & Kenyon LLP

(57) ABSTRACT

An image pickup apparatus satisfying certain conditional expressions comprises a zoom lens and an image pickup element. The zoom lens consists of, in order from the object side, a first lens unit having a positive refractive power in which a reflecting surface that deflects the optical path is provided, a second lens unit, comprising a plurality of negative lenses, having a negative refractive power, a rear lens unit, comprising a third lens unit and a fourth lens unit, having a positive refractive power, and an aperture stop between the second and fourth lens units. During zooming from the wide angle end to the telephoto end, the first lens unit is fixed, the second lens unit moves in such a way as to be located closer to the image side at the telephoto end than at the wide angle end, and the distances between the lens units change.

29 Claims, 17 Drawing Sheets

SA
FNO 3.778

-0.20  0.20
(mm)

AS
ω 40.93

-0.20  0.20
(mm)

DT
ω 40.93

-10.00  10.00
(%)

CC
ω 40.93

-0.02  0.02
(mm)

SA
FNO 4.031 g LINE — c LINE — d LINE
-0.20  0.20
(mm)

AS
ω 13.39
ΔS — ΔM

-0.20  0.20
(mm)

DT
ω 13.39

-10.00  10.00
(%)

CC
ω 13.39

-0.02  0.02
(mm)

SA
FNO 6.468

-0.20  0.20
(mm)

AS
ω 4.26

-0.20  0.20
(mm)

DT
ω 4.26

-10.00  10.00
(%)

CC
ω 4.26

-0.02  0.02
(mm)

435.84 —·—·—
656.27 — — —
587.56 ———

SA
FNO 3.868
-0.20  0.20
(mm)

AS
ω 40.87
-0.20  0.20
(mm)

DT
ω 40.87
-10.00  10.00
(%)

CC
ω 40.87
-0.02  0.02
(mm)

SA
FNO 5.655
-0.20  0.20
(mm)

AS
ω 13.10
-0.20  0.20
(mm)

DT
ω 13.10
-10.00  10.00
(%)

CC
ω 13.10
-0.02  0.02
(mm)

SA
FNO 6.794
-0.20  0.20
(mm)

AS
ω 4.22
-0.20  0.20
(mm)

DT
ω 4.22
-10.00  10.00
(%)

CC
ω 4.22
-0.02  0.02
(mm)

SA
FNO 3.870

-0.20   0.20
       (mm)

AS
ω 40.77

-0.20   0.20
       (mm)

DT
ω 40.77

-10.00  10.00
         (%)

CC
ω 40.77

-0.02   0.02
       (mm)

SA
FNO 5.943

-0.20   0.20
       (mm)

AS
ω 13.12

-0.20   0.20
       (mm)

DT
ω 13.12

-10.00  10.00
         (%)

CC
ω 13.12

-0.02   0.02
       (mm)

SA
FNO 6.765

-0.20   0.20
       (mm)

AS
ω 4.17

-0.20   0.20
       (mm)

DT
ω 4.17

-10.00  10.00
         (%)

CC
ω 4.17

-0.02   0.02
       (mm)

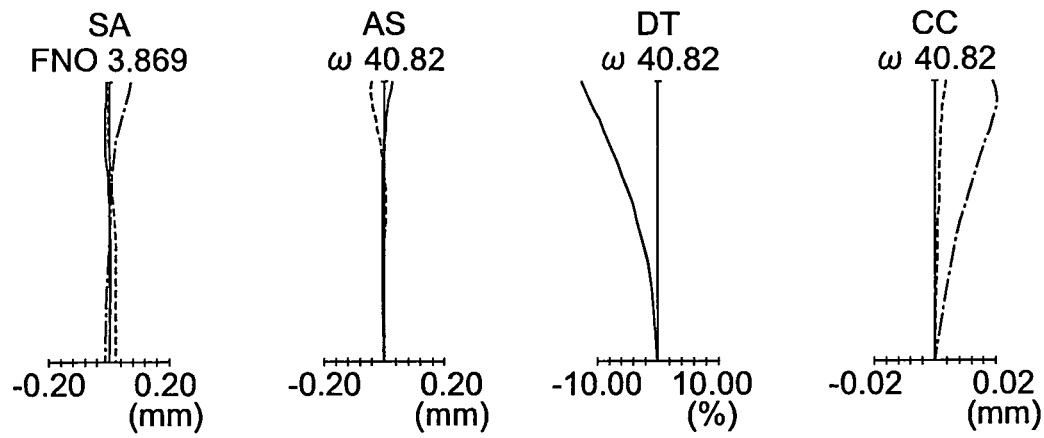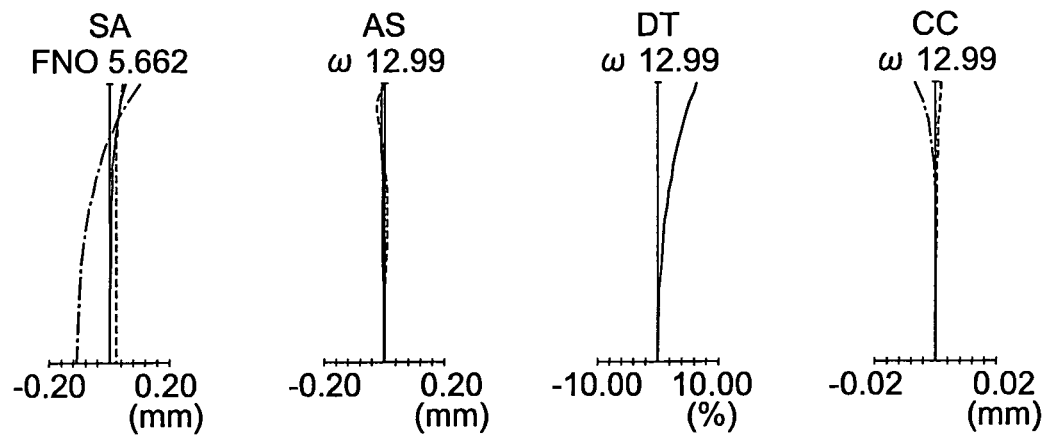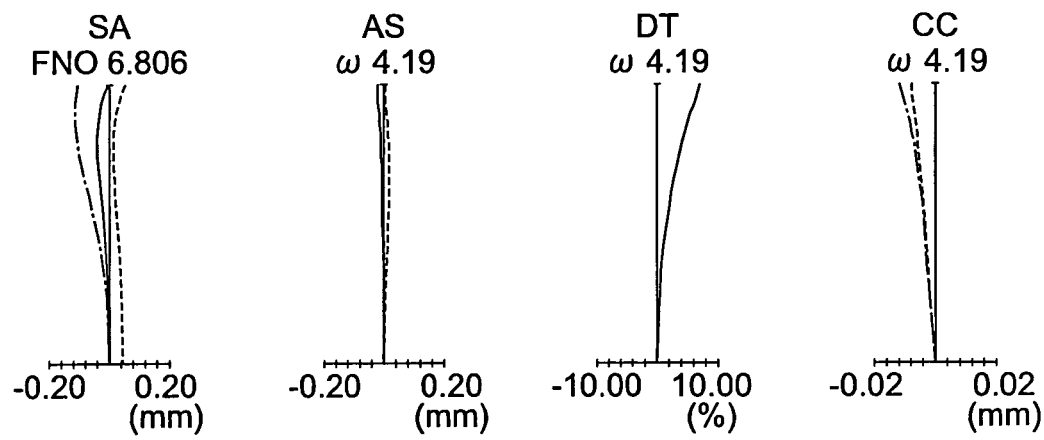

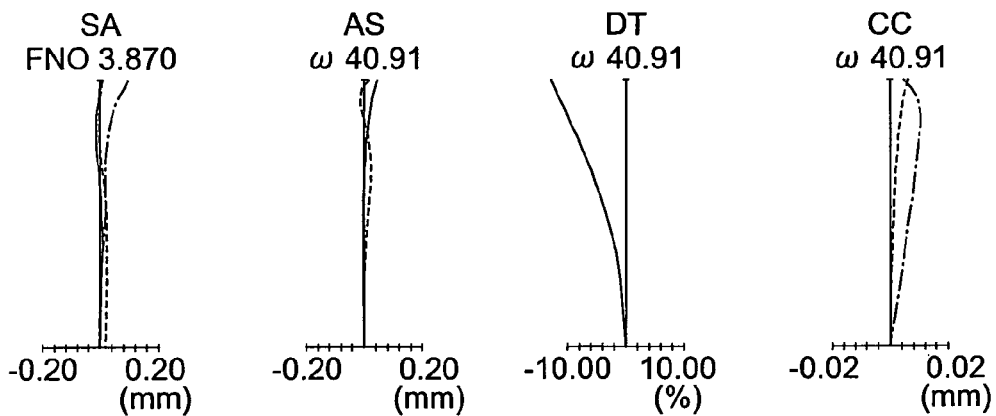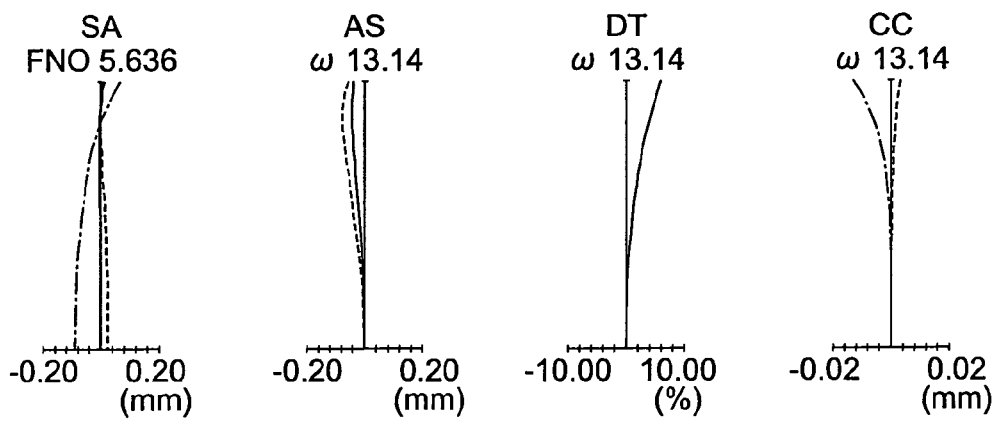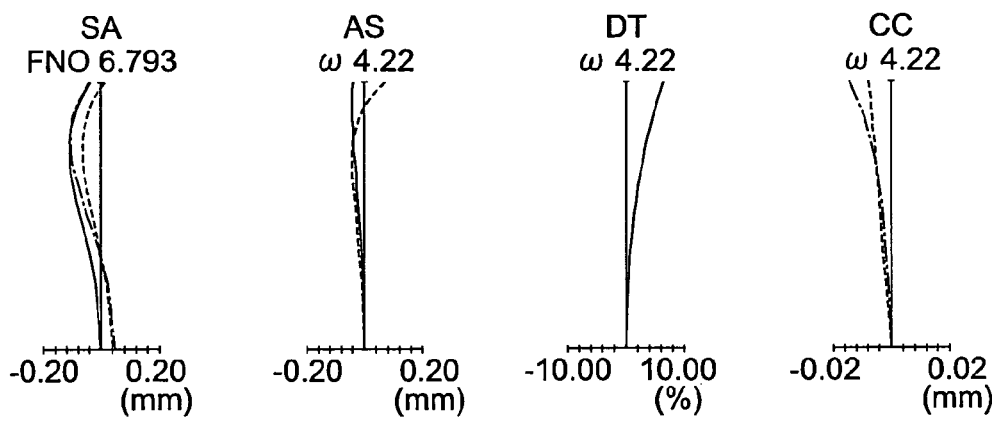

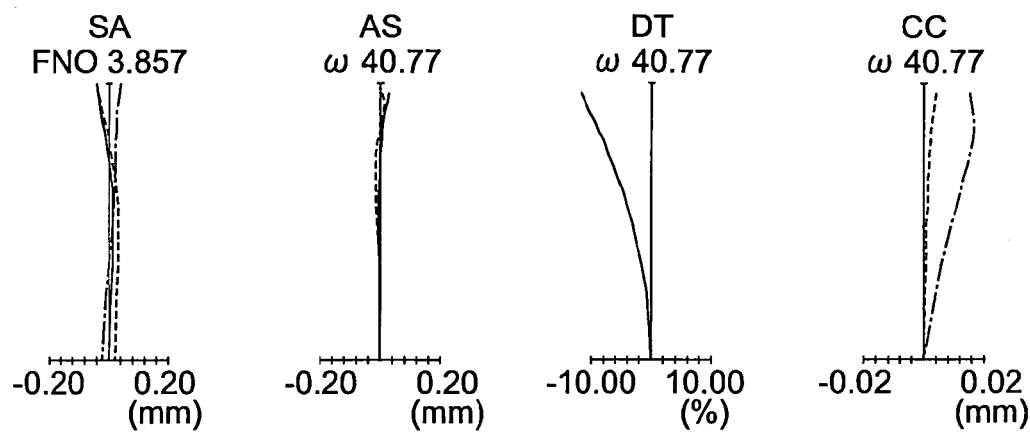
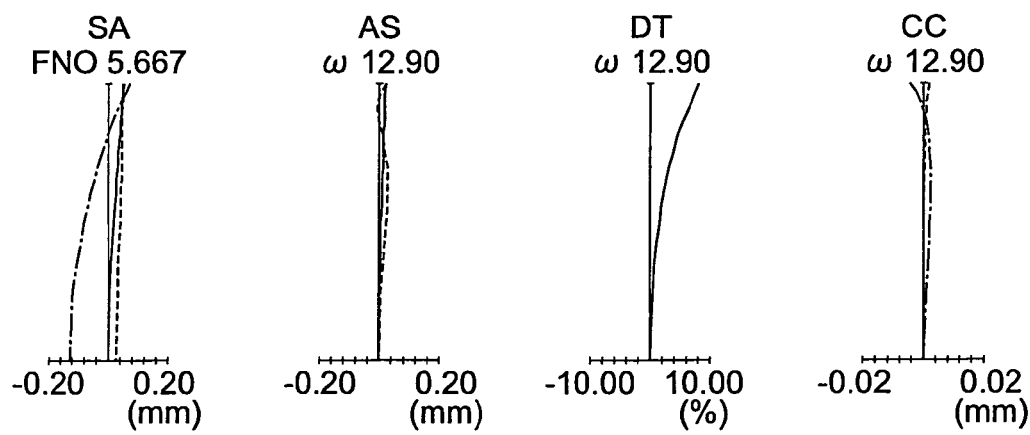
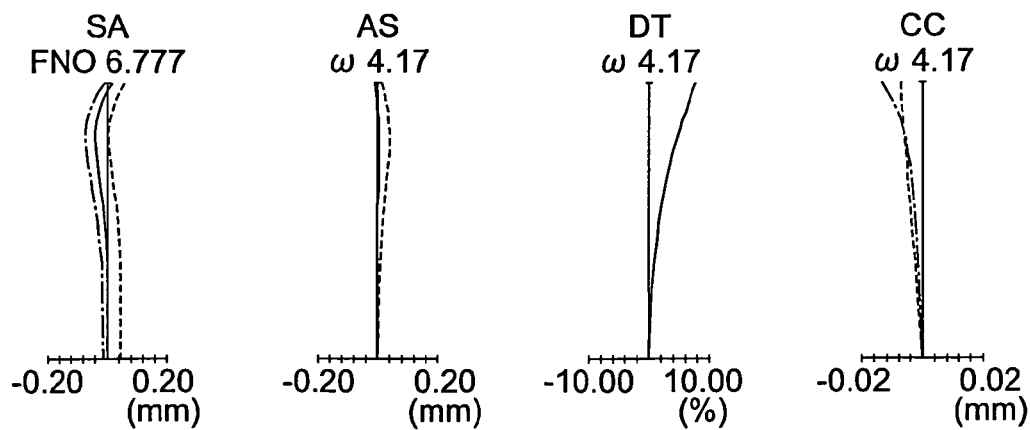

IMAGE PICKUP APPARATUS

CROSS-REFERENCE TO RELATED APPLICATION

The present application is based upon and claims the benefit of priority from the prior Japanese Patent Application No. 2010-205755 filed on Sep. 14, 2010; the entire contents of which are incorporated herein by reference.

BACKGROUND OF THE INVENTION

1. Field of the Invention

The present invention relates to an image pickup apparatus in which a reflecting member that deflects the optical path is provided in a zoom lens to reduce the thickness of the image pickup apparatus.

2. Description of the Related Art

Zoom lenses in which a reflecting member that deflects the optical path is provided in the optical path of the zoom lens to reduce the thickness of image pickup apparatuses (in particular digital cameras) have been known. In particular, there is a known image pickup apparatus equipped with a zoom lens in which a reflecting member is provided in the first lens unit closest to the object side among the lens units in the zoom lens and the zoom lens is fixed relative to the body of the apparatus to eliminate extension of the zoom lens from the apparatus body. Such elimination of the extension of the zoom lens from the apparatus body enables improvement in the resistance of the image pickup apparatus against dust, water and impacts.

Recently, needs for zoom lenses having a high zoom ratio and a wide angle of view have been growing in addition to needs for slimming of image pickup apparatuses. Japanese Patent Application Laid-Open Nos. 2008-129238, 2009-198719, and 2009-236973 disclose zoom lenses that responds to such needs.

The zoom lenses disclosed in Japanese Patent Application Laid-Open Nos. 2008-129238, 2009-198719, and 2009-236973 have five or more lens units in total including, in order from the object side, a first lens unit having a positive refractive power, a second lens unit having a negative refractive power, and a rear lens unit group having a positive refractive power, wherein a reflecting member (specifically a right angle prism) is provided in the first lens unit, and a plurality of lens units including the second lens unit is moved for zooming from the wide angle end to the telephoto end.

SUMMARY OF THE INVENTION

An image pickup apparatus according to the present invention comprises:

a zoom lens; and an image pickup element having an image pickup surface that converts an image formed by the zoom lens into an electrical signal, wherein the zoom lens consists of, in order from the object side, a first lens unit having a positive refractive power in which a reflecting surface that deflects the optical path is provided, a second lens unit having a negative refractive power, and a rear lens unit having a positive refractive power, wherein the rear lens unit comprises, in order from the object side, a third lens unit and a fourth lens unit, wherein an aperture stop is provided between the second lens unit and the fourth lens unit, wherein during zooming from the wide angle end to the telephoto end, the first lens unit is kept stationary, the second lens unit moves in such a way as to be located closer to the image side at the telephoto end than at the wide angle end, and the distances between the lens units change, wherein the second lens unit comprises a plurality of negative lenses, wherein the negative lens located closest to the object side among the plurality of negative lenses is referred to as a first negative lens, and wherein the following conditional expressions (a), (b), and (c-1) are satisfied:

$$3.3 < \beta_{2T}/\beta_{2W} < 34 \quad (a),$$

$$-0.14 < f_{2G1N}/f_T < -0.001 \quad (b), \text{ and}$$

$$0 < D_{2G1N}/f_T < 0.02 \quad (c\text{-}1),$$

where $\beta_{2T}$ is the lateral magnification of the second lens unit at the telephoto end, $\beta_{2W}$ is the lateral magnification of the second lens unit at the wide angle end, $f_{2G1N}$ is the focal length of the first negative lens in the second lens unit, $D_{2G1N}$ is the thickness of the first negative lens in the second lens unit on the optical axis, and $f_T$ is the focal length of the entire zoom lens system at the telephoto end.

BRIEF DESCRIPTION OF THE DRAWINGS

FIGS. 10A, 10B, 10C, 10D, 10E, 10F, 10G, 10H, 10I, 10J, 10K and 10L show aberrations of the zoom lens according to the fourth embodiment in the state in which the zoom lens is focused on an object point at infinity;

FIGS. 11A, 11B, 11C, 11D, 11E, 11F, 11G, 11H, 11I, 11J, 11K and 11L show aberrations of the zoom lens according to the fifth embodiment in the state in which the zoom lens is focused on an object point at infinity;

FIGS. 12A, 12B, 12C, 12D, 12E, 12F, 12G, 12H, 12I, 12J, 12K and 12L show aberrations of the zoom lens according to the sixth embodiment in the state in which the zoom lens is focused on an object point at infinity;

DETAILED DESCRIPTION OF THE INVENTION

Figure 1A:
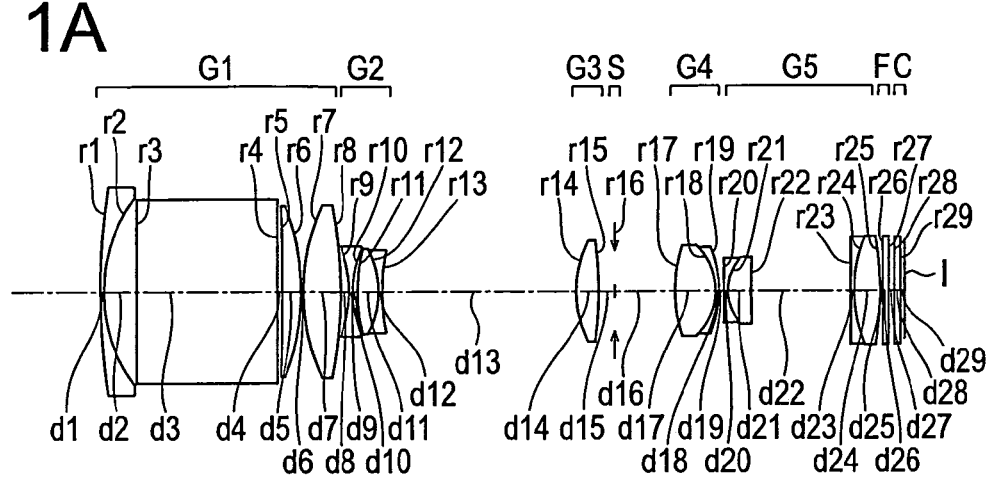
FIGS. 1A, 1B, and 1C are cross sectional views taken along the optical axis, showing the optical configuration of a zoom lens according to a first embodiment of the present invention in the state in which the zoom lens is focused on an object point at infinity, respectively at the wide angle end, in an intermediate state, and at the telephoto end.

The image pickup apparatus according to the present invention comprises:

a zoom lens, and an image pickup element having an image pickup surface that converts an image formed by the zoom lens into an electrical signal, wherein the zoom lens consists of, in order from the object side, a first lens unit having a positive refractive power in which a reflecting surface that deflects the optical path is provided, a second lens unit having a negative refractive power, and a rear lens unit having a positive refractive power, wherein the rear lens unit comprises, in order from the object side, a third lens unit and a fourth lens unit, wherein an aperture stop is provided between the second lens unit and the fourth lens unit, wherein during zooming from the wide angle end to the telephoto end, the first lens unit is kept stationary, the second lens unit moves in such a way as to be located closer to the image side at the telephoto end than at the wide angle end, and the distances between the lens units change, wherein the second lens unit comprises a plurality of negative lenses, wherein the negative lens located closest to the object side among the plurality of negative lenses is a first negative lens, and wherein the following conditional expressions (a), (b), and (c-1) are satisfied:

$$3.3 < \beta_{2T}/\beta_{2W} < 34 \quad (a),$$

$$-0.14 < f_{2G1N}/f_T < -0.001 \quad (b), \text{ and}$$

$$0 < D_{2G1N}/f_T < 0.02 \quad (c-1),$$

where $\beta_{2T}$ is the lateral magnification of the second lens unit at the telephoto end of the zoom range, $\beta_{2W}$ is the lateral magnification of the second lens unit at the wide angle end of the zoom range, $f_{2G1N}$ is the focal length of the first negative lens in the second lens unit, $D_{2G1N}$ is the thickness of the first negative lens in the second lens unit on the optical axis, and $f_T$ is the focal length of the entire zoom lens system at the telephoto end of the zoom range.

In the image pickup apparatus having the above-described structure, the optical path is deflected by the reflecting member provided in the first lens unit. This is advantageous for slimming of the image pickup apparatus.

Moreover, the zoom lens can easily be designed to have a constant overall length, and the second lens unit can appropriately provide the magnification changing effect. In addition, the use of four or more lens units in the zoom lens is advantageous for achieving an appropriate zoom ratio and for reducing the variation of aberrations.

A plurality of negative lenses are included in the second lens unit in order to facilitate reduction of aberrations while achieving an appropriately high negative refractive power of the second lens unit.

Conditional expression (a) specifies a preferred range of the magnification change provided by the second lens unit.

Having a plurality of negative lenses, the second lens unit can advantageously be adapted to have an appropriately high negative refractive power and reduced aberrations. Therefore, it is preferred that the second lens unit has the magnification changing function. If the ratio of magnification change provided by the second lens unit is excessively high, it will be difficult to achieve adequate brightness at the telephoto end of the zoom range.

It is preferred that the magnification change provided by the second lens unit be so large that the lower limit of conditional expression (a) is reached.

It is also preferred that the upper limit of conditional expression (a) be not exceeded so that appropriate brightness at the telephoto end is achieved.

Conditional expression (b) specifies a preferred range of the focal length of the negative lens located closest to the object side among the negative lenses in the second lens unit.

As this negative lens has so high a negative refractive power that the lower limit of conditional expression (b) is reached, the second lens unit can have an adequate negative refractive power advantageously. In addition, it is possible to make the principal point of the second lens unit closer to the object side, facilitating achieving an appropriate zoom ratio and reducing the amount of movement of the second lens unit. As a reduction of the amount of movement of the second lens unit is facilitated, a reduction of the incidence ray height on the first lens unit is also facilitated. This is advantageous for reducing the thickness of the camera and preventing an increase in the optical path length after the deflection of the optical path in the zoom lens.

As the negative refractive power of this negative lens is not so high that the upper limit of conditional expression (b) is not exceeded, a reduction of aberrations in the second lens unit is facilitated.

Conditional expression (c-1) specifies a preferred range of the thickness on the optical axis of the negative lens closest to the object side among the negative lenses in the second lens unit.

Not reaching the lower limit of conditional expression (c-1) means the absence of the negative lens on the optical axis.

As the upper limit of conditional expression (c-1) is not exceeded, the thickness on the optical axis of the negative lens closest to the object side can be made small, and the edge thickness of the negative lens also can easily be made small accordingly. Therefore, a space for allowing the movement of the second lens unit can easily be provided. Therefore, an appropriate zoom ratio can be achieved without making the refractive power of the second lens unit excessively high.

In the case where the zoom lens has the focusing function, the features described in the foregoing should be interpreted as those for the state in which the zoom lens is focused on an object at the longest distance. This also applies to the apparatuses according the other modes of the invention that will be described later.

It is more preferred that the apparatus according to the above mode of the present invention also have at least one of the features described in the following.

In the image pickup apparatus according to the present invention, the second lens unit comprises a plurality of negative lenses, the negative lens located closest to the image side among the negative lenses is a second negative lens, and it is preferred that the following conditional expression (c-2) be satisfied:

$$0 < D_{2G2N}/f_T < 0.02 \quad (c\text{-}2),$$

where $D_{2G2N}$ is the thickness of the second negative lens in the second lens unit on the optical axis.

The thickness of the second negative lens on the optical axis satisfying conditional expression (c-2) is advantageous for reducing the size of the second lens unit and for achieving an appropriate zoom ratio, leading to an improvement in the performance. The lower limit of conditional expression (c-2) is necessarily reached.

In the image pickup apparatus according to the present invention, it is preferred that the second lens unit comprise one or more positive lens elements located between the first negative lens and the second negative lens, that the first negative lens be a biconcave lens, and that the second negative lens be a biconcave lens.

If the second lens unit has a large magnification changing effect, spherical aberration tends to be conspicuous in the telephoto zoom range. Therefore it is preferred that the second lens unit be designed in such a way as not to generate so large spherical aberration in the zoom range near the telephoto end. Using the two negative lenses each having a biconcave shape in the second lens unit and providing a positive lens between these negative lenses are advantageous for achieving an appropriate negative refractive power and for reducing spherical aberration in the zoom range near the telephoto end. When this is the case, the first and second negative lenses each having a thickness on the optical axis that satisfies the aforementioned conditional expressions (c-1) and (c-2) are advantageous for reducing the size of the second lens unit and for achieving an appropriate refractive power, leading to an improvement in the performance.

In the image pickup apparatus according to the present invention, it is preferred that the following conditional expression (d-1) be satisfied:

$$0 < D_{2G1N}/D_{2GP} < 0.3 \quad (d\text{-}1),$$

where $D_{2GP}$ is the thickness on the optical axis of the positive lens that has the largest thickness on the optical axis among the positive lenses in the second lens unit.

If the thickness of the positive lens has so large a thickness that the upper limit of conditional expression (d-1) is not exceeded, the positive lens can readily have an appropriate refractive power, enabling cancellation of aberrations generated by the negative lenses in the second lens unit. The lower limit of conditional expression (d-1) is necessarily reached.

In the image pickup apparatus according to the present invention, it is preferred that the following conditional expression (d-2) be satisfied:

$$0 < D_{2G2N}/D_{2GP} < 0.3 \quad (d\text{-}2).$$

If the positive lens has so large a thickness on the optical axis and the second negative lens has so small a thickness on the optical axis that the upper limit of conditional expression (d-2) is not exceeded, a space for allowing movement of the second lens unit can be provided advantageously. The lower limit of conditional expression (d-2) is necessarily reached.

In the image pickup apparatus according to the present invention, it is preferred that the fourth lens unit comprises one negative lens element and one positive lens element and that the following conditional expression (e) be satisfied:

$$0 < D_{4GN}/D_{4GP} < 0.3 \quad (e),$$

where $D_{4GN}$ is the thickness on the optical axis of the negative lens element that has the largest thickness on the optical axis among the negative lens elements in the fourth lens unit, and $D_{4GP}$ is the thickness on the optical axis of the positive lens element that has the largest thickness on the optical axis among the positive lens elements in the fourth lens unit.

If the positive lens has so large a thickness on the optical axis that the upper limit of conditional expression (e) is not exceeded, the positive lens can easily be designed to have an appropriate positive refractive power. On the other hand, if the thickness on the optical axis of the negative lens is small, the size of the fourth lens unit along the optical axis can be made small. This is advantageous for achieving a reduction of aberrations and a reduction of the overall length at the same time. The lower limit of conditional expression (e) is necessarily reached.

In the image pickup apparatus according to the present invention, it is preferred that the fourth lens unit comprise a cemented lens made up of one or more positive lens elements and one or more negative lens elements that are cemented together.

While a reduction in the thickness on the optical axis of a negative lens element deteriorates the rigidity thereof, cementing the negative lens element to a positive lens element enhances the rigidity advantageously.

In the image pickup apparatus according to the present invention, it is preferred that the rear lens unit comprise a fifth lens unit provided on the image side of the fourth lens unit, and that the distance between the fourth lens unit and the fifth lens unit change during zooming from the wide angel end to the telephoto end.

Having five or more lens units in the zoom lens provides a further advantage for achieving an appropriately high zoom ratio and for reducing the variation in aberrations.

In the image pickup apparatus according to the present invention, it is preferred that the fifth lens unit comprises one negative lens element and one positive lens element, and that the following conditional expression (f) be satisfied:

$$0 < D_{5GN}/D_{5GP} < 0.3 \quad (f),$$

where $D_{5GN}$ is the thickness on the optical axis of the negative lens element that has the largest thickness on the optical axis among the negative lens elements in the fifth lens unit, and $D_{5GP}$ is the thickness on the optical axis of the positive lens element that has the largest thickness on the optical axis among the positive lens elements in the fifth lens unit.

If the positive lens has so large a thickness that the upper limit of conditional expression (f) is not exceeded, the positive lens can easily be designed to have an appropriate positive refractive power. On the other hand, if the thickness on the optical axis of the negative lens is small, the size of the fifth lens unit along the optical axis can be made small. This is advantageous for achieving a reduction of aberrations and a reduction of the overall length at the same time. The lower limit of conditional expression (f) is necessarily reached.

In the image pickup apparatus according to the present invention, it is preferred that the fifth lens unit comprise two or less cemented lenses each made up of one or more positive lens elements and one or more negative lens elements.

While a reduction in the thickness on the optical axis of a negative lens element deteriorates the rigidity thereof, cementing the negative lens element to a positive lens element enhances the rigidity advantageously.

In the image pickup apparatus according to the present invention, it is preferred that the rear lens unit comprise a sixth lens unit provided on the image side of the fifth lens unit, that the distance between the fifth lens unit and the sixth lens unit change during zooming from the wide angle end to the telephoto end, that the sixth lens unit comprise one negative lens element and one positive lens element, and that the following conditional expression (g) be satisfied:

$$0 < D_{6GN}/D_{6GP} < 0.3 \quad (g),$$

where $D_{6GN}$ is the thickness on the optical axis of the negative lens element that has the largest thickness on the optical axis among the negative lens elements in the sixth lens unit, and $D_{6GP}$ is the thickness on the optical axis of the positive lens element that has the largest thickness on the optical axis among the positive lens elements in the sixth lens unit.

If the positive lens has so large a thickness on the optical axis that the upper limit of conditional expression (g) is not exceeded, the positive lens can easily be designed to have an appropriate positive refractive power. On the other hand, if the thickness on the optical axis of the negative lens is small, the size of the sixth lens unit along the optical axis can be made small. This is advantageous for achieving a reduction of aberrations and a reduction of the overall length at the same time. The lower limit of conditional expression (g) is necessarily reached.

In the image pickup apparatus according to the present invention, it is preferred that the sixth lens unit comprise a cemented lens made up of one or more positive lens elements and one or more negative lens elements that are cemented together.

While a reduction in the thickness on the optical axis of a negative lens element deteriorates the rigidity thereof, cementing the negative lens element to a positive lens element enhances the rigidity advantageously.

In the image pickup apparatus according to the present invention, it is preferred that the following conditional expressions (1), (2), and (AA) be satisfied:

$$7 < f_T/f_W < 30 \quad (1),$$

$$0.5 < f_W/IH < 1.38 \quad (2), \text{ and}$$

$$-0.2 < f_{2G}/f_T < -0.05 \quad (AA),$$

where $f_W$ is the focal length of the entire zoom lens system at the wide angle end, IH is the largest image height in an effective image pickup area on the image pickup surface, and $f_{2G}$ is the focal length of the second lens unit.

Conditional expression (1) specifies a preferred range of the zoom ratio.

If the lower limit of conditional expression (1) is reached, users can enjoy the variation in the angle of view and capture objects in the frame in various shooting situations.

If the upper limit of conditional expression (1) is not exceeded, camera shake that can be caused with a large F-number at the telephoto end of the zoom range and noises in the image that can be generated with a gain increase for raising the effective sensitivity can readily be reduced.

Conditional expression (2) relates to a preferred range of the angle of view at the wide angle end.

If the lower limit of conditional expression (2) is reached, distortion can easily be made small and an increase in the number of lenses in the first lens unit can be prevented.

If the upper limit of conditional expression (2) is not exceeded, an advantage is obtained in shooting situations in which the distance between the apparatus and the subject is not so large, as is the case with indoor shooting.

Conditional expression (AA) specifies a preferred range of the focal length of the second lens unit.

If the lower limit of conditional expression (AA) is reached, the amount of movement of the second lens unit can be made small while achieving an appropriately high zoom ratio. This is advantageous for reducing the overall length of the zoom lens and for slimming the apparatus. In addition, the position of entrance pupil can be made closer to the object side. This is advantageous for achieving good imaging performance in the peripheral region of the image at the wide angle end and for achieving a wide angle of view with a small size zoom lens.

If the refractive power of the second lens unit is so low that the upper limit of conditional expression (AA) is not exceeded, the curvature of each lens surface can be prevented from becoming unduly high. This is advantageous for reduction of aberrations (in particular, distortion and astigmatism at the wide angle end and axial chromatic aberration, chromatic aberration of magnification and coma at the telephoto end). In addition, adverse effects of decentering of lenses can be made small.

In the image pickup apparatus according to the present invention, it is preferred that the following conditional expression (4) be satisfied:

$$1.8 < \Delta_{2G}/f_W < 15 \quad (4),$$

where $\Delta_{2G}$ is the displacement of the position of the second lens unit at the telephoto end from the position of the second lens unit at the wide angle end with a displacement toward the image side being represented by a positive value.

Conditional expression (4) specifies a range of the amount of movement of the second lens unit that is preferred for size reduction while achieving an appropriate zoom ratio and an appropriate angle of view.

If the amount of movement of the second lens unit is so large that the lower limit of conditional expression (4) is reached, the entire zoom lens system will constitute a retrofocus system at the wide angle end of the zoom range, enabling to achieve an adequate angle of view. In addition, the second lens unit can efficiently provide the magnification change. Therefore, the refractive power of the second lens unit can be made smaller. This facilitates reduction of aberrations in the second lens unit.

If the amount of movement of the second lens unit is so small that the upper limit of conditional expression (4) is not exceeded, the entrance pupil can easily be made closer to the first lens unit. Thus, the effective diameter of the first lens unit can be prevented from becoming large. This is advantageous for reducing the size of the image pickup apparatus while achieving an appropriate angle of view.

In the image pickup apparatus according to the present invention, it is preferred that the first lens unit comprise, in order from the object side, a negative lens element, a reflecting member, and a rear sub lens unit, the rear sub lens unit comprising a first positive lens and a second positive lens, and that the following conditional expression (3) be satisfied:

$$16.5 < |\nu_{dp1} - \nu_{dp2}| < 80 \qquad (3),$$

where $\nu_{dp1}$ is the Abbe constant of the first positive lens element in the first lens unit with respect to the d-line defined by the equation $\nu_{dp1} = (n_{d1}-1)/(n_{F1}-n_{C1})$ with $n_{d1}$, $n_{C1}$, and $n_{F1}$ being the refractive indices of the first positive lens with respect to the d-line, the C-line, and the F-line respectively, and $\nu_{dp2}$ is the Abbe constant of the second positive lens in the first lens unit with respect to the d-line defined by the equation $\nu_{dp2} = (n_{d2}-1)/(n_{F2}-n_{C2})$ with $n_{d2}$, $n_{C2}$, and $n_{F2}$ being the refractive indices of the second positive lens element with respect to the d-line, the C-line, and the F-line respectively.

In this configuration, the first lens unit function as a kind of wide converter lens, facilitating an increase in the angle of view. In addition, the first lens unit is has a plurality of positive lenses so as to achieve an appropriate zoom ratio advantageously. This is advantageous for correction of monochromatic aberrations.

Conditional expression (3) specifies a preferred range of the difference in the Abbe constant between the first positive lens and the second positive lens in the first lens unit.

If the difference in the Abbe constants is so large as to be larger than the lower limit of conditional expression (3) in an optical system having a high zoom ratio and not so large overall optical length, it will be possible to efficiently suppress chromatic aberration of magnification generated by the first positive lens in the first lens unit.

If the upper limit of conditional expression (3) is not exceeded, the ease of manufacturing of the positive lenses used in combination can be prevented from being deteriorated. This enhances cost-effectiveness also.

In the image pickup apparatus according to the present invention, it is preferred that the rear lens unit comprises three or more lens units each having a positive refractive power.

In order to achieve an appropriately large angle of view at the wide angle end, it is necessary for the composite system made up of the third and subsequent lens units to have an adequately high positive refractive power. In the above-described configuration, the rear lens unit group includes at least three lens units each having a positive refractive power. Therefore, these lens units each having a positive refractive power can contribute to the positive refractive power. This is advantageous for achieving good performance.

In the image pickup apparatus according to the present invention, it is preferred that the rear lens unit comprise, in order from the object side, a third lens unit having a positive refractive power, a fourth lens unit having a positive refractive power, and a fifth lens unit having a positive refractive power, that the distances between the lens units change during zooming from the wide angle end to the telephoto end, and that the total number of the lens units be five.

In this five-unit zoom lens with a positive-negative-positive-positive-positive configuration, the second lens unit can be designed to provide the principal magnification change. To achieve an appropriately large angle of view at the wide angle end, it is necessary for the composite system made up of the third and subsequent lens units to have an adequately high positive refractive power. With the use of the three lens units each having a positive refractive power, the positive refractive powers can be distributed to these lens units. This is advantageous for achieving size reduction with a reduced number of lens units and for achieving good performance.

In the image pickup apparatus according to the present invention, it is preferred that the first negative lens in the second lens unit have an aspheric surface.

This is advantageous for achieving an appropriate negative refractive power in the paraxial region and correction of off-axis aberrations such as coma at the wide angle end at the same time.

In the image pickup apparatus according to the present invention, it is preferred that the following conditional expression (E) be satisfied:

$$0.05 < \Delta_{2G}/f_T < 0.4 \qquad (E),$$

where $\Delta_{2G}$ is the displacement of the position of the second lens unit at the telephoto end from the position of the second lens unit at the wide angle end with a displacement toward the image side being represented by a positive value.

If the lower limit of conditional expression (E) is reached, the refractive power of the second lens unit that is needed to achieve an appropriate zoom ratio can be made small. This is advantageous for correction of aberrations.

If the upper limit of conditional expression (E) is not exceeded, the amount of movement of the second lens unit can be made small. This is advantageous for reduction in the overall length.

In the image pickup apparatus according to the present invention, it is preferred that the following conditional expression (F) be satisfied:

$$0.5 < \Sigma_{2G}/f_W < 1.0 \qquad (F),$$

where $\Sigma_{2G}$ is the thickness of the second lens unit on the optical axis.

If the thickness of the second lens unit is so large that the lower limit of conditional expression (F) is reached, the second lens unit can include an appropriate number of lenses and air lenses. This is advantageous for correction of aberrations.

If the thickness of the second lens unit is so small that the upper limit of conditional expression (F) is not exceeded, a space for movement of the second lens unit can easily be provided.

In the image pickup apparatus according to the present invention, it is preferred that the aperture stop be kept stationary during zooming from the wide angle end to the telephoto end.

This leads to a simplification of the mechanism and eliminates an unnecessary space for allowing movement of the stop, facilitating size reduction.

In the image pickup apparatus according to the present invention, it is preferred that the third lens unit have a positive refractive power and be kept stationary during zooming from the wide angle end to the telephoto end, and that the aperture stop be kept stationary during zooming from the wide angle end to the telephoto end.

This leads to a simplification of the mechanism and makes the ray height in the movable lens units located on the rear side of the aperture stop low. This is advantageous for achieving both high zoom ratio and size reduction.

In the image pickup apparatus according to the present invention, it is preferred that the rear lens unit comprise a third lens unit having a positive refractive power, a fourth lens unit having a positive refractive power, a fifth lens unit having a negative refractive power provided on the image side of the fourth lens unit, and a sixth lens unit having a positive refractive power provided on the image side of the fifth lens unit, wherein the distances between the lens units change during zooming from the wide angle end to the telephoto end.

Having a fifth lens unit having a negative refractive power in the rear lens unit facilitates reduction of the effective diameter of the third and fourth lens units. This is advantageous for slimming of the optical system. This is also advantageous for correction of curvature of field.

Moreover, the sixth lens unit having a positive refractive power facilitates shifting the position of the exit pupil away from the image plane. This is advantageous for reduction of shading. In addition, this leads to a reduction in the size of the optical system, in the case where focusing is performed by moving the fifth lens unit.

In the image pickup apparatus according to the present invention, it is preferred that one of the first and second positive lenses satisfy the following conditional expression (5A) and the other of them satisfy the following conditional expression (5B):

$$\nu_{dpone} > 60 \quad (5A), \text{ and}$$

$$\nu_{dpoth} < 60 \quad (5B),$$

where $\nu_{dpone}$ is the Abbe constant of one of the first and second positive lenses with respect to the d-line defined by the equation $\nu_{dpone} = (n_{d3}-1)/(n_{F3}-n_{C3})$ with $n_{d3}$, $n_{F3}$, and $n_{C3}$ being the refractive indices of one of the first and second positive lenses with respect to the d-line, the F-line, and the C-line respectively, and $\nu_{dpoth}$ is the Abbe constant of the other of the first and second positive lenses with respect to the d-line defined by the equation $\nu_{dpoth} = (n_{d4}-1)/(n_{F4}-n_{C4})$ with $n_{d4}$, $n_{F4}$, and $n_{C4}$ being the refractive indices of the other of the first and second positive lenses respect to the d-line, the F-line, and the C-line respectively.

In the optical system having a high zoom ratio and a relatively small overall optical length, if the materials for the first and second positive lenses are so selected that both the above conditional expressions (5A) and (5B) are satisfied, one of the positive lenses will have a large relative partial dispersion, enabling efficient reduction of chromatic aberration of magnification in the first lens unit with small secondary spectrum.

In the image pickup apparatus according to the present invention, it is preferred that the following conditional expression (A) be satisfied:

$$0.1 < n_{dp1} - n_{dp2} < 0.65 \quad (A),$$

where $n_{dp1}$ is the refractive index with respect to the d-line of one of the first and second positive lenses that has an Abbe constant smaller than that of the other, and $n_{dp2}$ is the refractive index with respect to the d-line of the one of the first and second positive lenses that has an Abbe constant larger than that of the other.

If the difference in the refractive indices is so large that the lower limit of conditional expression (A) is reached, the lens that is larger in the Abbe constant can provide correction of chromatic aberration, and the other lens can have an appropriately high refractive power, which is advantageous for achieving a high zoom ratio.

If the upper limit of conditional expression (A) is not exceeded, an increase in the cost of the material of the positive lenses can be prevented.

In the image pickup apparatus according to the present invention, it is preferred that the third lens unit have a positive refractive power, that a fourth lens unit have a positive refractive power, that the third lens unit be kept stationary during zooming from the wide angle end to the telephoto end, that the aperture stop be kept stationary during zooming from the wide angle end to the telephoto end, and that the fourth lens unit move along the optical axis during zooming from the wide angle end to the telephoto end.

If the third lens unit has a positive refractive power, the effective diameter of the fourth lens unit can readily be made small. This leads to a reduction in the diameter of the zoom lens (or slimming of the image pickup apparatus). In addition, the fourth lens unit can have the function of changing the magnification or the function of adjusting the position of the image plane with its movement along the optical axis.

In the image pickup apparatus according to the present invention, it is preferred that the rear lens unit comprise a fifth lens unit having a negative refractive power provided on the image side of the fourth lens unit, and that the fifth lens unit be kept stationary during zooming from the wide angle end to the telephoto end.

If the fifth lens unit having a positive refractive power is provided, the exit pupil can easily be made distant from the image plane. This facilitates a reduction in the effect of shading. In addition, keeping the fifth lens unit stationary makes the number of the movable lens units in the rear lens unit small, leading to a simplification of the structure.

In the image pickup apparatus according to the present invention, it is preferred that the rear lens unit comprise a fifth lens unit having a negative refractive power provided on the image side of the fourth lens unit and a sixth lens unit having a negative refractive power provided on the image side of the fifth lens unit, that the distance between the fifth lens unit and the sixth lens unit change during zooming from the wide angle end to the telephoto end, and that the fifth lens unit move during focusing.

Having a negative lens unit in the rear lens unit enables a reduction in the effective diameter of the third and fourth lens units. This is advantageous for slimming of the optical system and for correction of curvature of field. Furthermore, focusing by the fifth lens unit leads to a reduction in the size of the optical system.

It is preferred that the image pickup apparatus according to the present invention have an image transformation section that transforms, by image processing, an electrical signal representing an image having distortion attributed to the zoom lens into an image signal representing an image that is corrected in terms of distortion.

This can decrease the level of distortion correction required to be achieved in the zoom lens, and the components provided on the object side of the reflecting member may only be one negative lens component or one negative lens. This is advantageous for slimming of the image pickup apparatus.

It is more preferred that two or more of the above described features be adopted in combination.

In conditional expression (a), it is more preferred that the lower limit value be 4, still more preferably 4.5, and the upper limit value be 20, still more preferably 10.

In conditional expression (b), it is more preferred that the lower limit value be −0.13, still more preferably −0.12, still more preferably −0.11, and the upper limit value be −0.01, still more preferably −0.03, still more preferably −0.05.

It is more preferred that the lower limit of conditional expression (c-1) be 0.002, still more preferably 0.004. These further limitations of the lower limit will lead to an improvement in the resistance of the negative lens against impact that may act on it when, for example, the apparatus falls down.

It is more preferred that the upper limit of conditional expression (c-1) be 0.015, still more preferably 0.01.

It is more preferred that the lower limit of conditional expression (c-2) be 0.002, still more preferably 0.004. These further limitations of the lower limit will lead to an improvement in the resistance of the negative lens against impact that may act on it when, for example, the apparatus falls down.

It is more preferred that the upper limit of conditional expression (c-2) be 0.015, still more preferably 0.01.

It is more preferred that the lower limit of conditional expression (d-1) be 0.02, still more preferably 0.05. These further limitations of the lower limit will lead to an improvement in the resistance of the negative lens against impact that may act on it when, for example, the apparatus falls down.

It is more preferred that the upper limit of conditional expression (d-1) be 0.25, still more preferably 0.2.

It is more preferred that the lower limit of conditional expression (d-2) be 0.02, still more preferably 0.05. These further limitations of the lower limit will lead to an improvement in the resistance of the negative lens against impact that may act on it when, for example, the apparatus falls down.

It is more preferred that the upper limit of conditional expression (d-2) be 0.25, still more preferably 0.2.

It is more preferred that the lower limit of conditional expression (e) be 0.02, still more preferably 0.05. These further limitations of the lower limit will lead to an improvement in the resistance of the negative lens against impact that may act on it when, for example, the apparatus falls down.

It is more preferred that the upper limit of conditional expression (e) be 0.2, still more preferably 0.13.

It is more preferred that the lower limit of conditional expression (f) be 0.02, still more preferably 0.05. These further limitations of the lower limit will lead to an improvement in the resistance of the negative lens against impact that may act on it when, for example, the apparatus falls down.

It is more preferred that the upper limit of conditional expression (f) be 0.25, still more preferably 0.18.

It is more preferred that the lower limit of conditional expression (g) be 0.02, still more preferably 0.05. These further limitations of the lower limit will lead to an improvement in the resistance of the negative lens against impact that may act on it when, for example, the apparatus falls down.

It is more preferred that the upper limit of conditional expression (g) be 0.2, still more preferably 0.15.

It is more preferred that the lower limit of conditional expression (1) be 7.5, still more preferably 8, still more preferably 9.

It is more preferred that the upper limit of conditional expression (1) be 24, still more preferably 12.

In conditional expression (2), it is more preferred that the lower limit value be 0.6, still more preferably 0.7, still more preferably 1.0, and the upper limit value be 1.37, still more preferably 1.36, still more preferably 1.34.

In conditional expression (AA), it is more preferred that the lower limit value be −0.19, still more preferably −0.18, and the upper limit value be −0.06, still more preferably −0.08.

In conditional expression (4), it is more preferred that the lower limit value be 1.85, still more preferably 1.9, still more preferably 1.95, still more preferably 2.35, still more preferably 2.79, and the upper limit value be 13, still more preferably 10, still more preferably 5.

In conditional expression (3), it is more preferred that the lower limit value be 20, still more preferably 22, still more preferably 24, and the upper limit value be 65, still more preferably 60, still more preferably 45.

In conditional expression (5A), it is more preferred that the lower limit value be 65, still more preferably 70.

In conditional expression (5B), it is more preferred that the upper limit value be 55, still more preferably 50.

In conditional expression (A), it is more preferred that the lower limit value be 0.15, still more preferably 0.2, and the upper limit value be 0.5, still more preferably 0.4, still more preferably 0.3.

In conditional expression (E), it is more preferred that the lower limit value be 0.1, still more preferably 0.15, and the upper limit value be 0.37, still more preferably 0.35, still more preferably 0.32.

In conditional expression (F), it is more preferred that the lower limit value be 0.53, still more preferably 0.55, still more preferably 0.6, and the upper limit value be 0.98, still more preferably 0.94, still more preferably 0.70.

The present invention can provide an image pickup apparatus equipped with a zoom lens that can be designed to have not so large overall length while having an appropriately high zoom ratio and satisfactorily good optical performance.

In the following, embodiments of the image pickup apparatus according to the present invention will be described in detail with reference to the accompanying drawings. It should be understood that the present invention is not limited by the embodiments.

EMBODIMENTS

In the following, first to sixth embodiments of the zoom lens used in the image pickup apparatus according to the present invention will be described. FIGS. 1A, 2A, 3A, 4A, 5A, and 6A are cross sectional views of the zoom lenses according to the first to sixth embodiments in the state in which the they are focused on an object point at infinity at the wide angle end, FIGS. 1B, 2B, 3B, 4B, 5B, and 6B are cross sectional views of the zoom lenses according to the first to sixth embodiments in the state in which the they are focused on an object point at infinity in an intermediate focal length state, and FIGS. 1C, 2C, 3C, 4C, 5C, and 6C are cross sectional views of the zoom lenses according to the first to sixth embodiments in the state in which the they are focused on an object point at infinity at the telephoto end. In FIGS. 1A to 6C, a first lens unit is denoted by G1, a second lens unit is denoted by G2, a third lens unit is denoted by G3, a fourth lens unit is denoted by G4, a fifth lens unit is denoted by G5, a sixth lens unit is denoted by G6, an aperture stop is denoted by S, a plane parallel plate constituting a low pass filter on which wavelength range restriction coating for restricting infrared light is denoted by F, a plane parallel plate constituting a cover glass for an electronic image pickup element is denoted by C, and the image plane is denoted by I. The cover glass C may have a multi-layer film for wavelength range restriction applied on its surface. The cover glass C may be adapted to have the low-pass filtering function. The low-pass filtering function of the plane parallel plate F may be eliminated.

In all the embodiments, the position of the aperture stop S is fixed (namely, the aperture stop S is immovable). All the numerical data presented below are for the state in which the zoom lens is focused on an object at infinity. In the numerical data, dimensions are in millimeters and angles are in degrees. In the first to fourth embodiments, the focusing operation is performed by moving the fourth lens unit G4. In the fifth to sixth embodiments, the focusing operation is performed by moving the fifth lens unit G5. Zoom data will be given for the wide angle end (WE), an intermediate zoom state (ST) defined in connection with the present invention, and the telephoto end (TE).

Figure 1B:
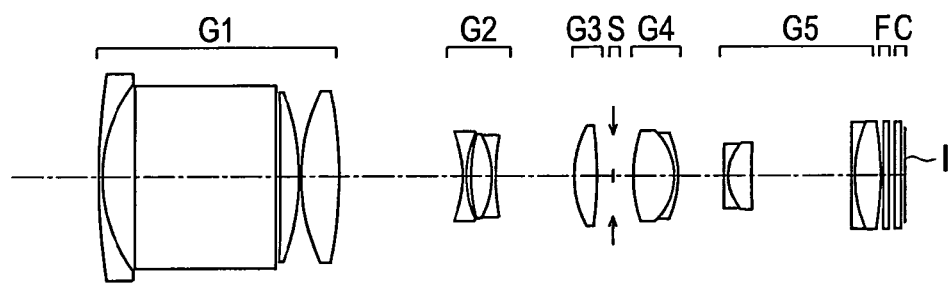
Figure 1C:
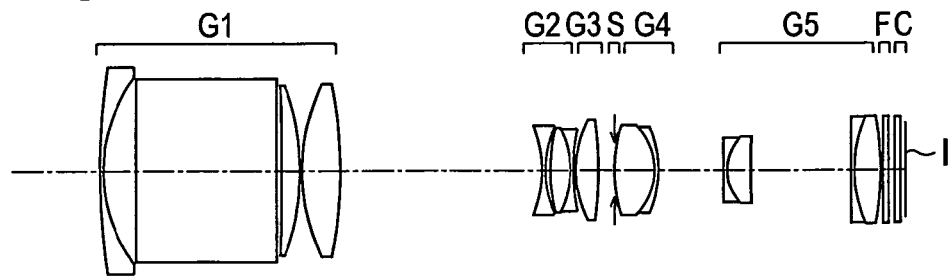

As shown in FIGS. 1A, 1B, and 1C, the zoom lens according to the first embodiment includes, in order from its object side, a first lens unit G1 having a positive refractive power, a second lens unit G2 having a negative refractive power, a third lens unit G3 having a positive refractive power, an aperture stop S, a fourth lens unit G4 having a positive refractive power, and a fifth lens unit G5 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

Figure 16:
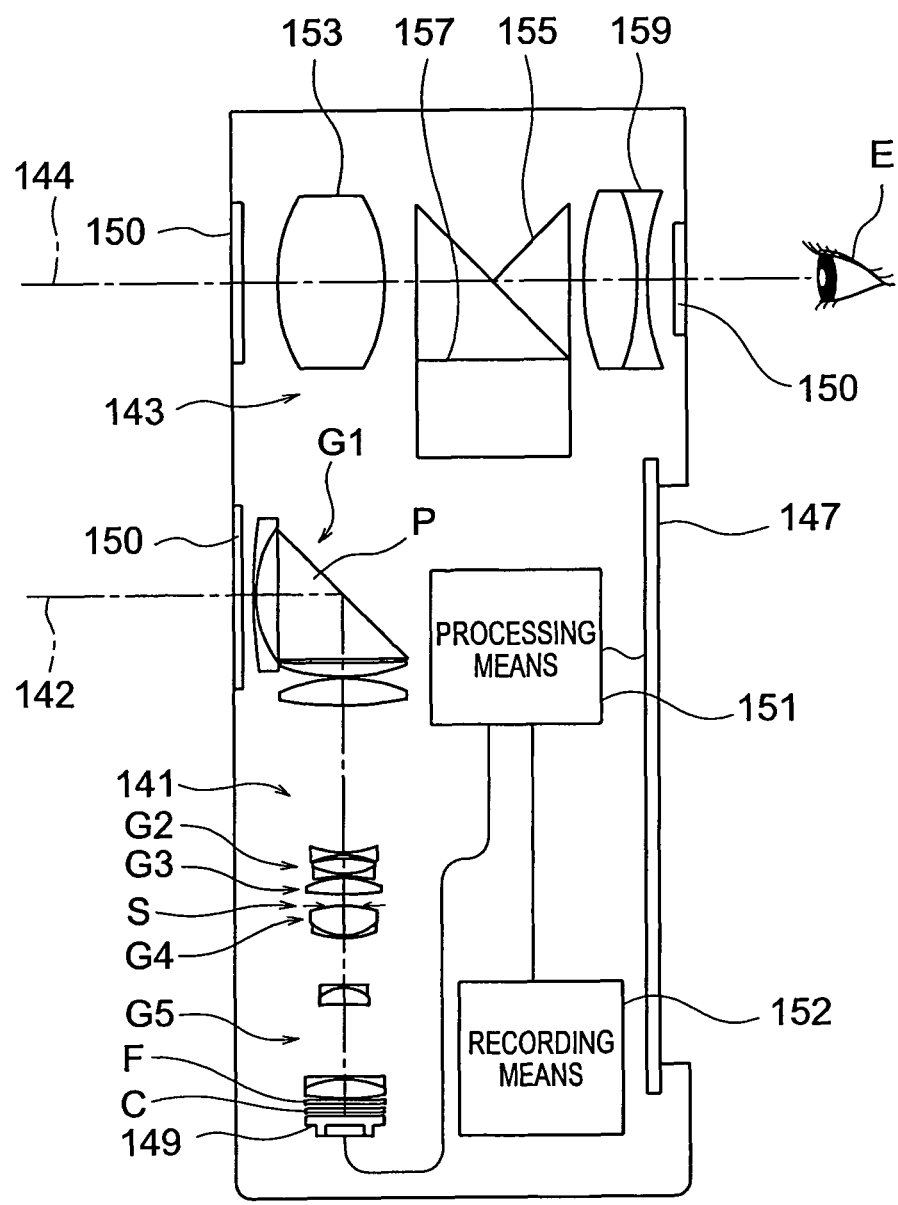
FIG. 16 is a cross sectional view of the digital camera.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a negative meniscus lens having a convex surface directed toward the object side and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side. FIGS. 1A to 6C are extended views in which the reflecting surface of the prism is not illustrated. Actually, the prisms used in the first to sixth embodiments shown in FIGS. 1A to 6C are rectangular prisms as shown in FIG. 16.

There are seven aspheric surfaces, which include both surfaces of the object side biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 2A:
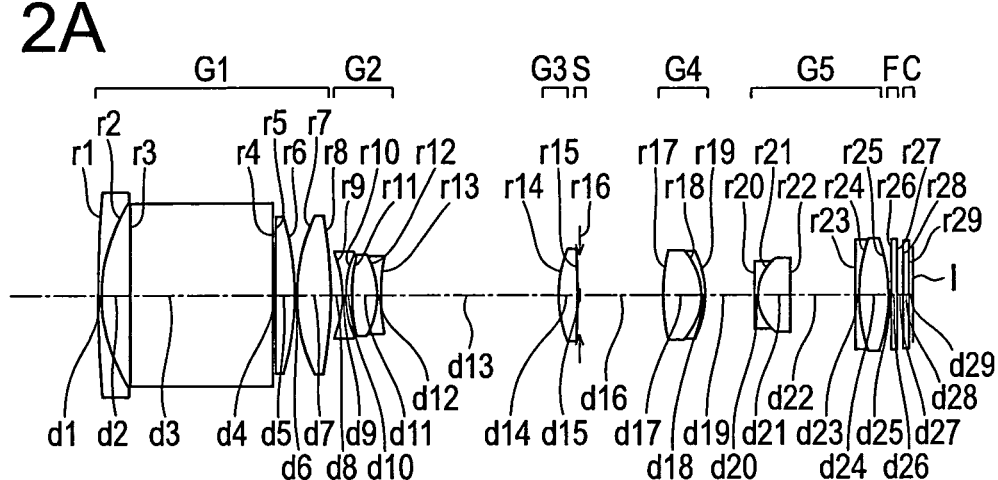
FIGS. 2A, 2B, and 2C are cross sectional views taken along the optical axis, showing the optical configuration of a zoom lens according to a second embodiment of the present invention in the state in which the zoom lens is focused on an object point at infinity, respectively at the wide angle end, in an intermediate state, and at the telephoto end.
Figure 2B:
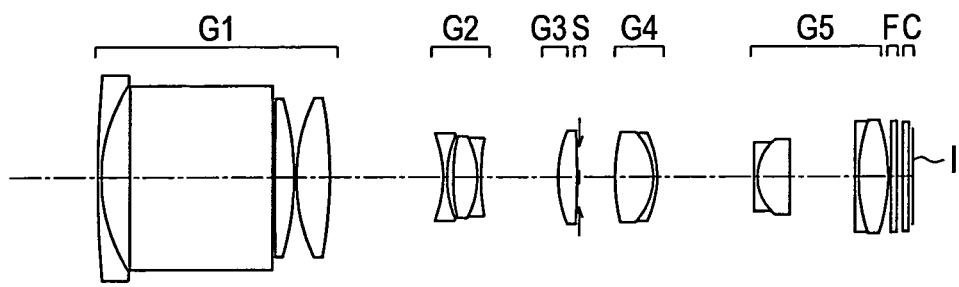
Figure 2C:
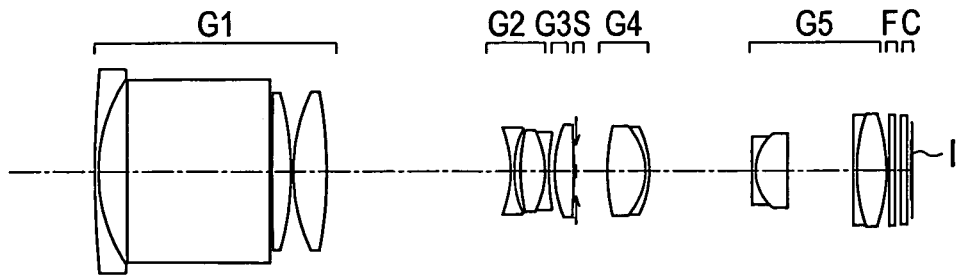

As shown in FIGS. 2A, 2B, and 2C, the zoom lens according to the second embodiment includes, in order from its object side, a first lens unit G1 having a positive refractive power, a second lens unit G2 having a negative refractive power, a third lens unit G3 having a positive refractive power, an aperture stop S, a fourth lens unit G4 having a positive refractive power, and a fifth lens unit G5 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a negative meniscus lens having a convex surface directed toward the object side and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the object side biconvex positive lens in the first lens unit G1, the object side surface of the image side biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 3A:
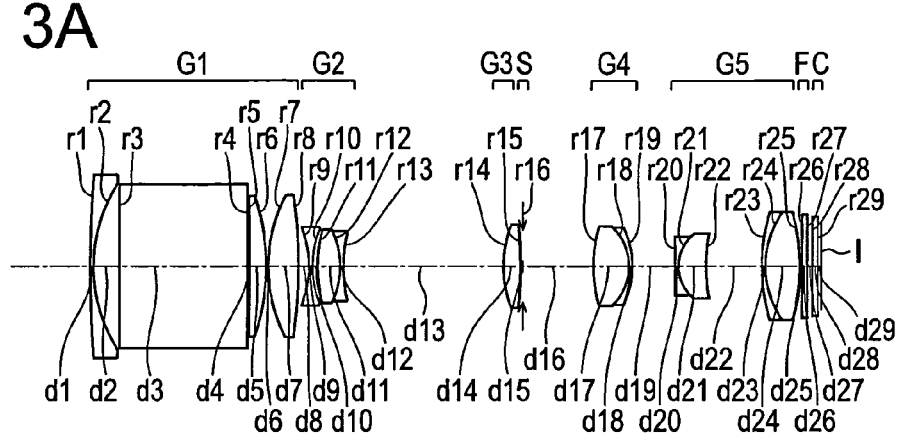
FIGS. 3A, 3B, and 3C are cross sectional views taken along the optical axis, showing the optical configuration of a zoom lens according to a third embodiment of the present invention in the state in which the zoom lens is focused on an object point at infinity, respectively at the wide angle end, in an intermediate state, and at the telephoto end.
Figure 3B:
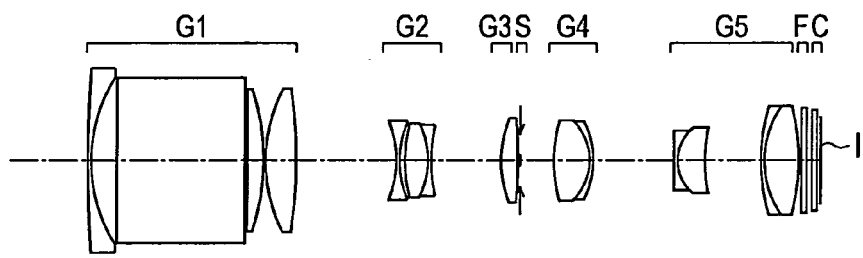
Figure 3C:
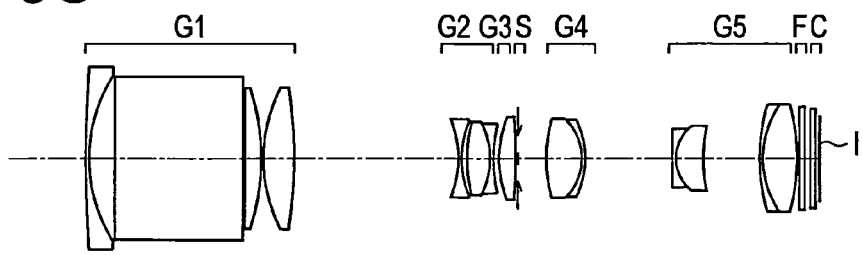

As shown in FIGS. 3A, 3B, and 3C, the zoom lens according to the third embodiment includes, in order from its object side, a first lens unit G1 having a positive refractive power, a second lens unit G2 having a negative refractive power, a third lens unit G3 having a positive refractive power, an aperture stop S, a fourth lens unit G4 having a positive refractive power, and a fifth lens unit G5 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

The first lens unit G1 is composed of a negative meniscus lens having a convex surface directed toward the object side, a prism, a positive meniscus lens having a convex surface directed toward the image side, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lend and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the positive meniscus lens in the first lens unit G1, the object side surface of the biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 4A:
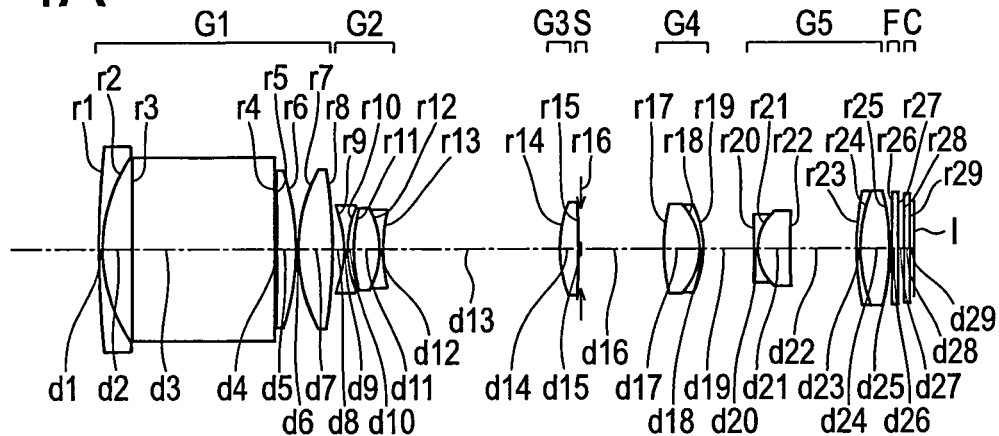
FIGS. 4A, 4B, and 4C are cross sectional views taken along the optical axis, showing the optical configuration of a zoom lens according to a fourth embodiment of the present invention in the state in which the zoom lens is focused on an object point at infinity, respectively at the wide angle end, in an intermediate state, and at the telephoto end.
Figure 4B:
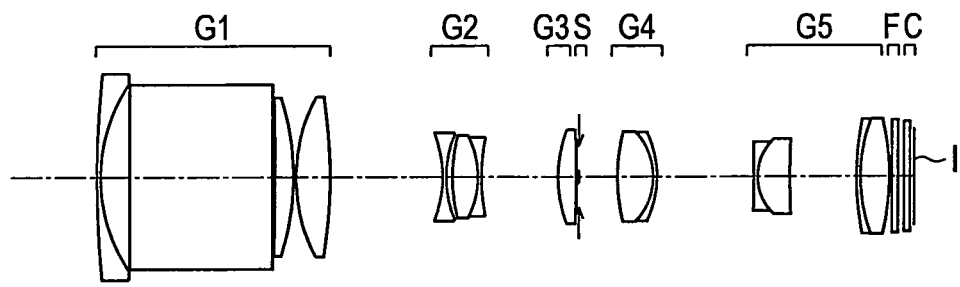
Figure 4C:
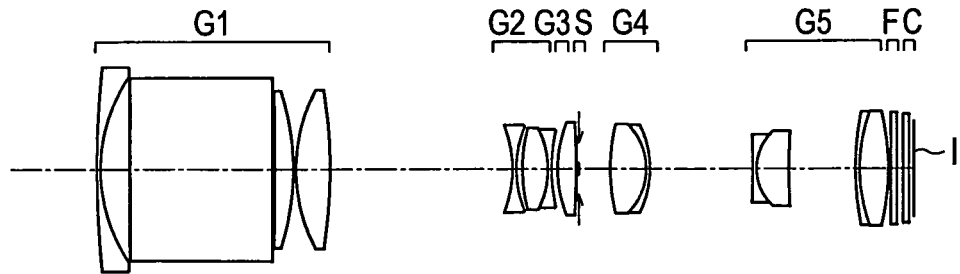

As shown in FIGS. 4A, 4B, and 4C, the zoom lens according to the fourth embodiment includes, in order from its object side, a first lens unit G1 having a positive refractive power, a second lens unit G2 having a negative refractive power, a third lens unit G3 having a positive refractive power, an aperture stop S, a fourth lens unit G4 having a positive refractive power, and a fifth lens unit G5 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 is fixed.

The first lens unit G1 is composed of a negative meniscus lens having a convex surface directed toward the object side, a prism, a positive meniscus lens having a convex surface directed toward the image side, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the positive meniscus lens in the first lens unit G1, the object side surface of the biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 5A:
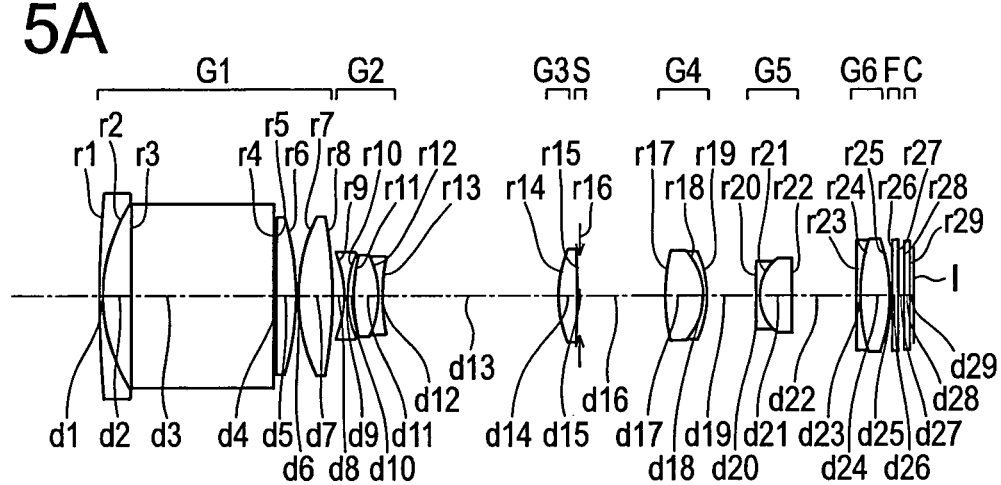
FIGS. 5A, 5B, and 5C are cross sectional views taken along the optical axis, showing the optical configuration of a zoom lens according to a fifth embodiment of the present invention in the state in which the zoom lens is focused on an object point at infinity, respectively at the wide angle end, in an intermediate state, and at the telephoto end.
Figure 5B:
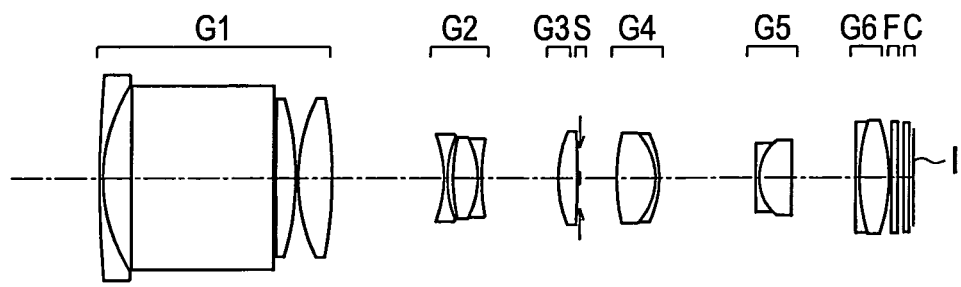
Figure 5C:
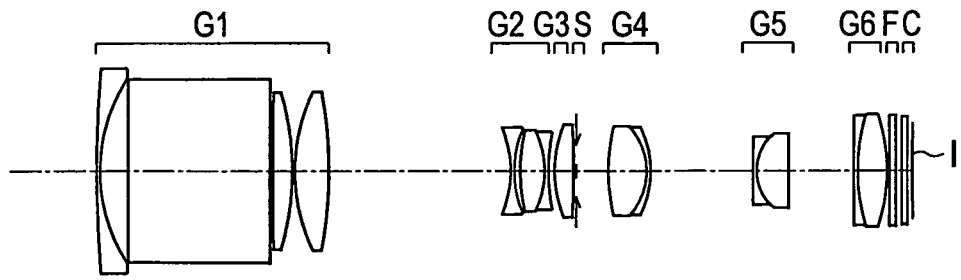

As shown in FIGS. 5A, 5B, and 5C, the zoom lens according to the first embodiment includes, in order from its object side, a first lens unit G1 having a positive refractive power, a second lens unit G2 having a negative refractive power, a third lens unit G3 having a positive refractive power, an aperture stop S, a fourth lens unit G4 having a positive refractive power, a fifth lens unit G5 having a negative refractive power, and a sixth lens unit G6 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves first toward the image side and thereafter toward the object side, and the sixth lens unit G6 is fixed.

The first lens unit G1 is composed of a negative meniscus lens having a convex surface directed toward the object side, a prism, a biconvex positive lens, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a negative meniscus lens having a convex surface directed toward the object side and a positive meniscus lens having a convex surface directed toward the object side. The sixth lens unit G6 is composed of a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the object side biconvex positive lens in the first lens unit G1, the object side surface of the image side biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Figure 6A:
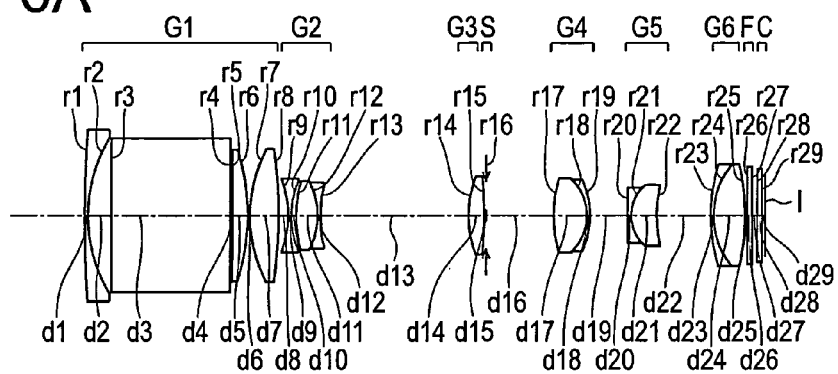
FIGS. 6A, 6B, and 6C are cross sectional views taken along the optical axis, showing the optical configuration of a zoom lens according to a sixth embodiment of the present invention in the state in which the zoom lens is focused on an object point at infinity, respectively at the wide angle end, in an intermediate state, and at the telephoto end.
Figure 6B:
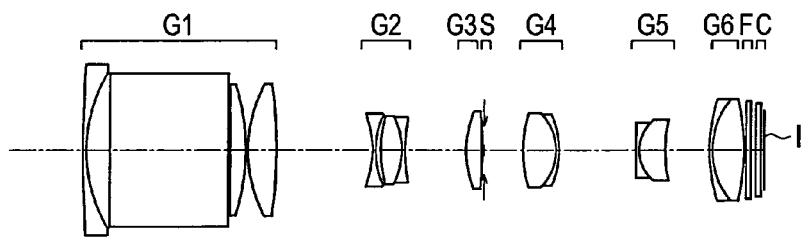
Figure 6C:
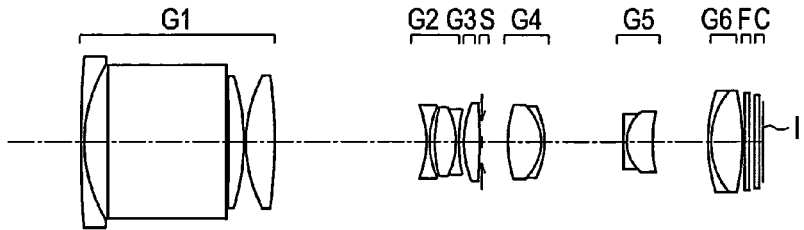
Figure 7A:
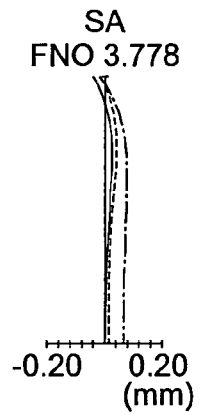
FIGS. 7A, 7B, 7C, 7D, 7E, 7F, 7G, 7H, 7I, 7J, 7K and 7L show aberrations of the zoom lens according to the first embodiment in the state in which the zoom lens is focused on an object point at infinity.
Figure 7B:
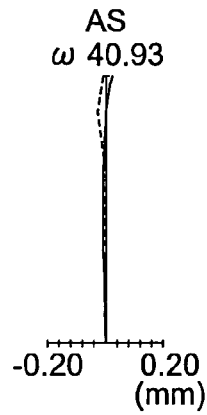
Figure 7C:
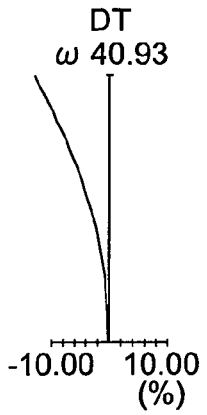
Figure 7D:
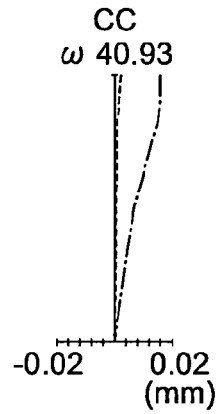
Figure 7E:
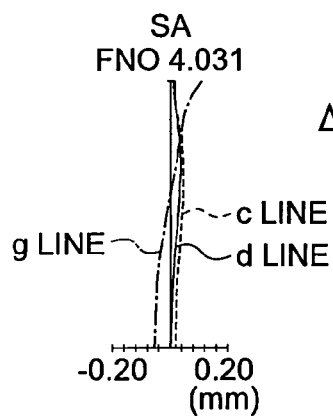
Figure 7F:
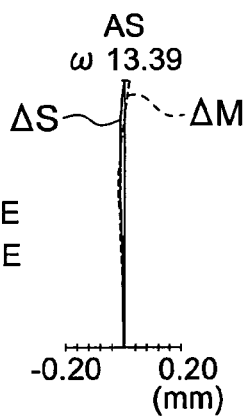
Figure 7G:
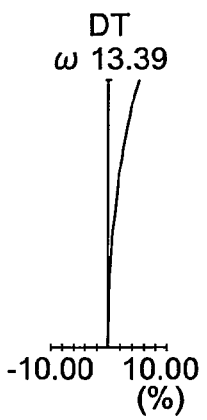
Figure 7H:
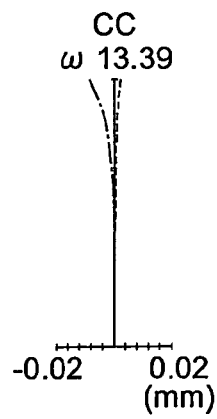
Figure 7I:
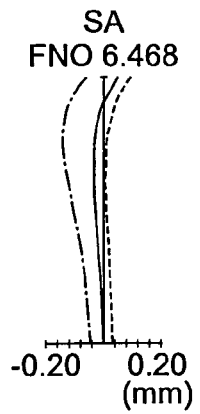
Figure 7J:
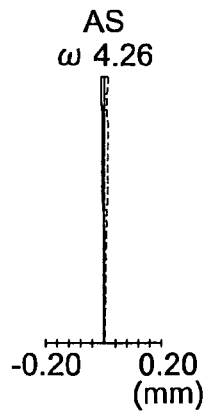
Figure 7K:
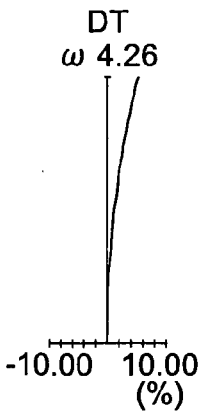
Figure 7L:
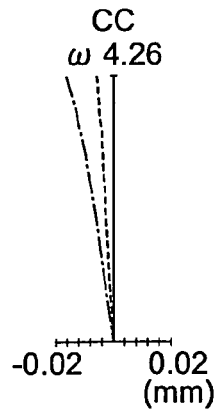
Figure 8A:
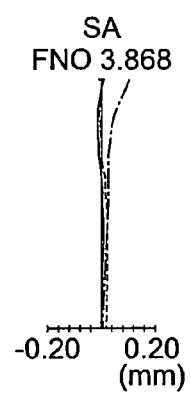
FIGS. 8A, 8B, 8C, 8D, 8E, 8F, 8G, 8H, 8I, 8J, 8K and 8L show aberrations of the zoom lens according to the second embodiment in the state in which the zoom lens is focused on an object point at infinity.
Figure 8B:
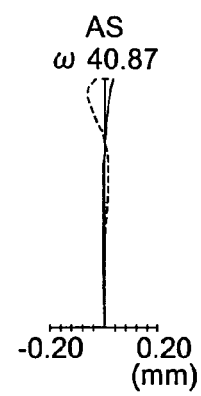
Figure 8C:
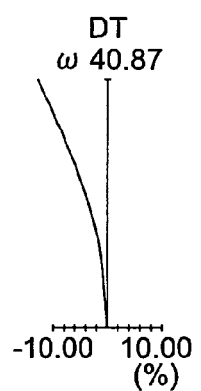
Figure 8D:
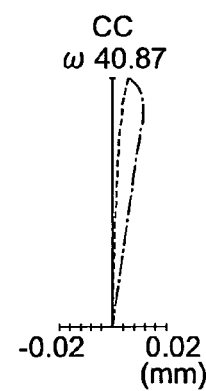
Figure 8E:
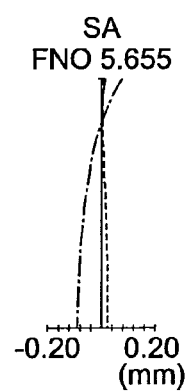
Figure 8F:
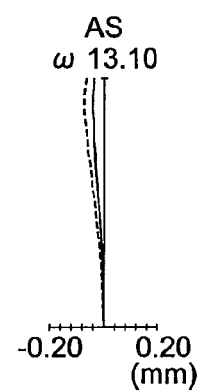
Figure 8G:
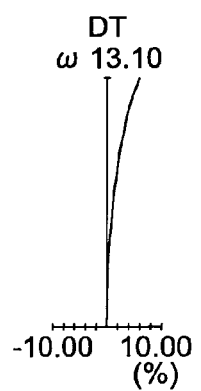
Figure 8H:
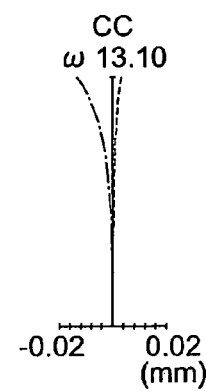
Figure 8I:
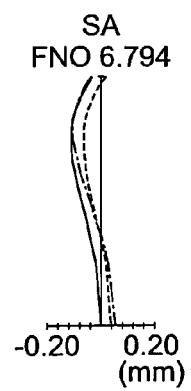
Figure 8J:
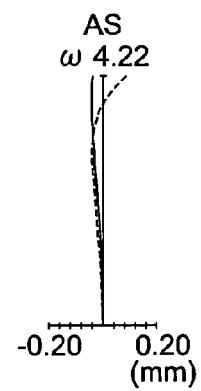
Figure 8K:
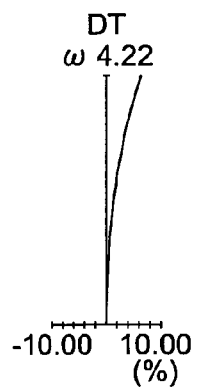
Figure 8L:
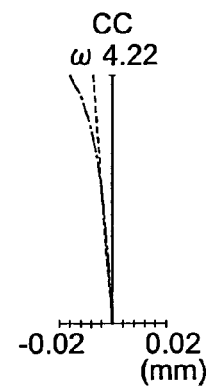
Figure 9A:
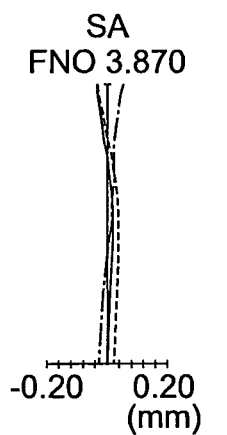
FIGS. 9A, 9B, 9C, 9D, 9E, 9F, 9G, 9H, 9I, 9J, 9K and 9L show aberrations of the zoom lens according to the third embodiment in the state in which the zoom lens is focused on an object point at infinity.
Figure 9B:
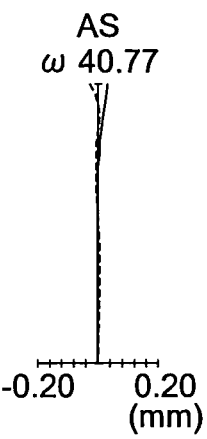
Figure 9C:
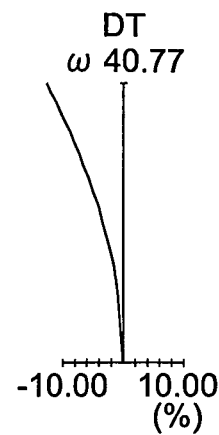
Figure 9D:
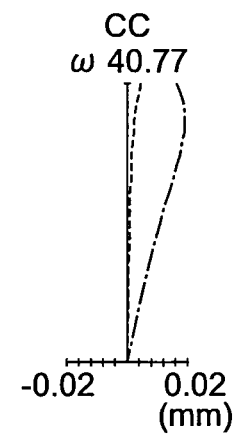
Figure 9E:
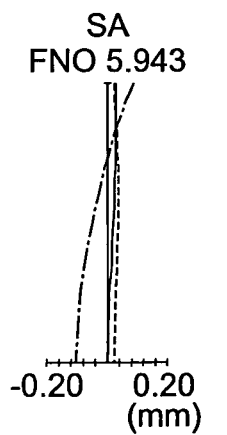
Figure 9F:
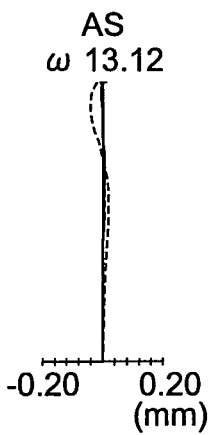
Figure 9G:
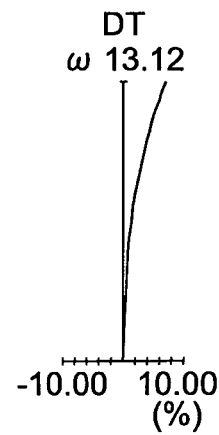
Figure 9H:
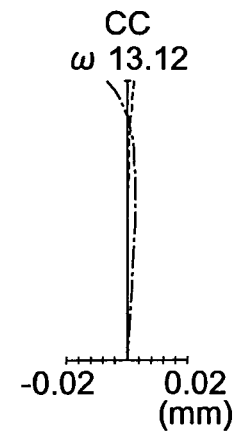
Figure 9I:
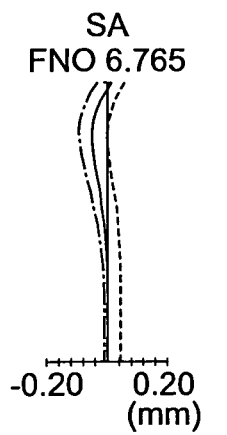
Figure 9J:
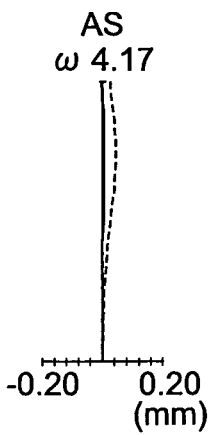
Figure 9K:
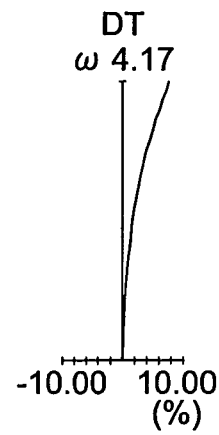
Figure 9L:
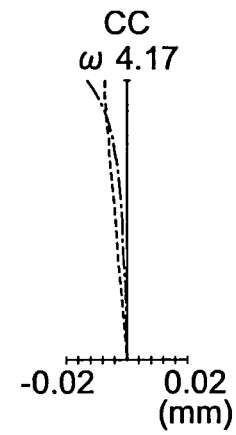

As shown in FIGS. 6A, 6B, and 6C, the zoom lens according to the sixth embodiment includes, in order from its object side, a first lens unit G1 having a positive refractive power, a second lens unit G2 having a negative refractive power, a third lens unit G3 having a positive refractive power, an aperture stop S, a fourth lens unit G4 having a positive refractive power, the fifth lens unit G5 having a negative refractive power, and a sixth lens unit G6 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves first toward the image side and thereafter toward the object side, and the sixth lens unit G6 is fixed.

The first lens unit G1 is composed of a negative meniscus lens having a convex surface directed toward the object side, a prism, a positive meniscus lens having a convex surface directed toward the image side, and a biconvex positive lens. The second lens unit G2 is composed of a biconcave negative lens, and a cemented lens made up of a biconvex positive lens and a biconcave negative lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side. The sixth lens unit G6 is composed of a cemented lens made up of a negative meniscus lens having a convex surface directed toward the object side and a biconvex positive lens. The lens elements in each of the lens units are arranged in the mentioned order from the object side.

There are eight aspheric surfaces, which include both surfaces of the positive meniscus lens in the first lens unit G1, the object side surface of the biconvex positive lens in the first lens unit G1, both surfaces of the object side biconcave negative lens in the second lens unit G2, both surfaces of the biconvex positive lens in the third lens unit G3, and the object side surface of the biconvex positive lens in the fourth lens unit G4.

Numerical data of each embodiment described above is shown below. Apart from symbols described above, BF denotes a back focus, f1, f2, . . . denotes a focal length of each lens unit, FNO denotes an F number, ω denotes a half image angle, r denotes radius of curvature of each lens surface, d denotes a distance between two lenses, nd denotes a refractive index of each lens for a d-line, and νd denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis, $$Z=(Y^2/r)/[1+\{1-(K+1)(Y/r)^2\}^{1/2}]+A_4Y^4+A_6Y^6+A_8Y^8+A_{10}Y^{10}+A_{12}Y^{12} \quad (I)$$

where, r denotes a paraxial radius of curvature, K denotes a conical coefficient, $A_4, A_6, A_8, A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

| | Unit mm | | | |
|---|---|---|---|---|
| | Surface data | | | |
| Surface no. | r | d | nd | vd |
| Object plane | ∞ | ∞ | | |
| 1 | 59.401 | 0.30 | 2.00069 | 25.46 |
| 2 | 13.480 | 2.80 | | |
| 3 | ∞ | 12.00 | 1.90366 | 31.32 |
| 4 | ∞ | 0.40 | | |
| 5* | 1232.087 | 1.62 | 1.69350 | 50.81 |
| 6* | −22.751 | 0.20 | | |
| 7 | 18.049 | 3.18 | 1.49700 | 81.54 |
| 8 | −37.859 | Variable | | |
| 9* | −9.260 | 0.30 | 1.90200 | 25.10 |
| 10* | 8.560 | 0.40 | | |
| 11 | 13.967 | 1.76 | 1.94595 | 17.98 |
| 12 | −7.799 | 0.30 | 1.88300 | 40.76 |
| 13 | 17.106 | Variable | | |
| 14* | 9.276 | 1.90 | 1.64000 | 60.08 |
| 15* | −32.298 | 1.33 | | |
| 16(Stop) | ∞ | Variable | | |
| 17* | 12.089 | 3.43 | 1.49700 | 81.54 |
| 18 | −5.538 | 0.30 | 1.81474 | 37.03 |
| 19 | −9.800 | Variable | | |
| 20 | 6676.747 | 0.30 | 2.00069 | 25.46 |
| 21 | 4.278 | 1.97 | 1.48749 | 70.23 |
| 22 | 86.346 | 8.45 | | |
| 23 | 27545.921 | 0.30 | 1.78800 | 47.37 |
| 24 | 11.263 | 2.22 | 2.00178 | 19.32 |
| 25 | −27.676 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane (Light receiving surface) | ∞ | | | |
| | Aspherical surface data | | | |

5th surface k = 0.000
A4 = −4.55193e−05,   A6 = 2.12970e−07,   A8 = −5.68692e−09,   A10 = 3.58892e−11

6th surface k = 0.000
A4 = −4.03682e−05,   A6 = 8.17547e−08,   A8 = −4.79231e−09,   A10 = 1.91112e−11

9th surface k = 0.022
A4 = −1.54045e−05,   A6 = 8.57920e−05,   A8 = −5.27561e−06,   A10 = 1.28547e−07

10th surface k = 0.000
A4 = −8.97191e−04,   A6 = 9.33285e−05,   A8 = −5.04541e−06,   A10 = 1.21119e−07

14th surface k = −0.210
A4 = −1.77237e−04,   A6 = −1.84408e−06,   A8 = 1.91057e−07,   A10 = −2.01819e−09

15th surface k = −0.750
A4 = 2.90516e−06,   A6 = −7.58964e−07,   A8 = 1.91447e−07,   A10 = −2.60774e−09

17th surface k = −0.069
A4 = −2.78165e−04,   A6 = 3.98997e−06,   A8 = 2.69493e−07   A10 = 1.14659e−09

Various data

Image height    3.84

-continued

| Unit mm | | | |
|---|---|---|---|
| | Wide angle | Inter mediate | Telephoto |
| Focal length | 5.10 | 15.33 | 48.99 |
| Fno. | 3.78 | 4.03 | 6.47 |
| Angle of field 2ω | 81.85 | 26.79 | 8.52 |
| BF (in air) | 1.70 | 1.70 | 1.70 |
| Lens total length (in air) | 68.05 | 68.05 | 68.05 |
| d8 | 0.74 | 10.54 | 17.23 |
| d13 | 16.65 | 6.85 | 0.16 |
| d16 | 5.09 | 1.68 | −0.002 |
| d19 | 0.41 | 3.82 | 5.498 |

| Unit focal length | | | | |
|---|---|---|---|---|
| f1 = 17.80 | f2 = −5.43 | f3 = 11.46 | f4 = 15.48 | f5 = 904.35 |

Example 2

| Unit mm | | | | |
|---|---|---|---|---|
| Surface data | | | | |
| Surface no. | r | d | nd | νd |
| Object plane | ∞ | ∞ | | |
| 1 | 98.044 | 0.30 | 2.00069 | 25.46 |
| 2 | 14.655 | 2.40 | | |
| 3 | ∞ | 12.00 | 1.90366 | 31.32 |
| 4 | ∞ | 0.21 | | |
| 5* | 440.266 | 1.66 | 1.74320 | 49.34 |
| 6* | −24.067 | 0.20 | | |
| 7* | 15.643 | 2.82 | 1.49700 | 81.54 |
| 8 | −38.441 | Variable | | |
| 9* | −8.106 | 0.30 | 1.90200 | 25.10 |
| 10* | 9.366 | 0.50 | | |
| 11 | 15.799 | 2.11 | 1.94595 | 17.98 |
| 12 | −7.459 | 0.30 | 1.88300 | 40.76 |
| 13 | 17.002 | Variable | | |
| 14* | 9.828 | 1.59 | 1.61881 | 63.85 |
| 15* | −84.989 | 0.20 | | |
| 16 (Stop) | ∞ | Variable | | |
| 17* | 14.941 | 3.19 | 1.49700 | 81.54 |
| 18 | −5.741 | 0.30 | 1.85026 | 32.27 |
| 19 | −9.027 | Variable | | |
| 20 | 37844.005 | 0.30 | 2.00069 | 25.46 |
| 21 | 4.119 | 2.71 | 1.51633 | 64.14 |
| 22 | 2300.054 | 5.44 | | |
| 23 | 195576.211 | 0.30 | 1.78800 | 47.37 |
| 24 | 15.551 | 2.43 | 2.00178 | 19.32 |
| 25 | −15.191 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane (Light receiving surface) | ∞ | | | |

Aspherical surface data

5th surface k = 0.000
A4 = −7.29349e−09, A6 = 5.92276e−08, A8 = 3.58975e−10

6th surface k = 0.000
A4 = −5.02229e−06, A6 = −4.64566e−08, A8 = 5.60501e−10

-continued

| Unit mm |
|---|

7th surface k = 0.000
A4 = −1.79535e−05, A6 = −1.70267e−07, A8 = −1.34058e−10

9th surface k = −0.062
A4 = 8.77765e−04, A6 = 2.30116e−05, A8 = −1.30857e−06

10th surface k = 0.000
A4 = −1.60869e−04, A6 = 3.94832e−05, A8 = −1.67268e−06

14th surface k = 1.855
A4 = −4.07126e−04, A6 = −1.01307e−05, A8 = 1.38015e−07

15th surface k = 11.561
A4 = 2.15113e−05, A6 = −7.05366e−06, A8 = 4.26788e−07

17th surface k = −2.147
A4 = −2.02600e−04, A6 = 2.99789e−07, A8 = 2.60322e−07

| Various data | |
|---|---|
| Image height | 3.84 |

| | Wide angle | Inter mediate | Telephoto |
|---|---|---|---|
| Focal length | 5.11 | 15.59 | 48.86 |
| Fno. | 3.87 | 5.66 | 6.79 |
| Angle of field 2ω | 81.74 | 26.20 | 8.45 |
| BF (in air) | 1.72 | 1.72 | 1.72 |
| Lens total length (in air) | 68.13 | 68.13 | 68.13 |
| d8 | 1.00 | 9.54 | 15.58 |
| d13 | 15.06 | 6.52 | 0.48 |
| d16 | 6.97 | 3.01 | 2.64 |
| d19 | 4.13 | 8.09 | 8.46 |

| Unit focal length | | | | |
|---|---|---|---|---|
| f1 = 16.11 | f2 = −5.03 | f3 = 14.33 | f4 = 15.63 | f5 = 25.88 |

Example 3

Unit mm

Surface data

| Surface no. | r | d | nd | νd |
|---|---|---|---|---|
| Object plane | ∞ | ∞ | | |
| 1 | 123.704 | 0.30 | 2.00069 | 25.46 |
| 2 | 15.106 | 2.40 | | |
| 3 | ∞ | 12.00 | 1.90366 | 31.32 |
| 4 | ∞ | 0.21 | | |
| 5* | −452.617 | 1.55 | 1.74320 | 49.34 |
| 6* | −22.245 | 0.20 | | |
| 7* | 14.601 | 2.87 | 1.49700 | 81.54 |
| 8 | −44.750 | Variable | | |
| 9* | −7.957 | 0.30 | 1.90200 | 25.10 |
| 10* | 9.394 | 0.50 | | |
| 11 | 13.840 | 2.16 | 1.94595 | 17.98 |
| 12 | −7.607 | 0.30 | 1.88300 | 40.76 |
| 13 | 14.935 | Variable | | |
| 14* | 10.223 | 1.59 | 1.61881 | 63.85 |
| 15* | −54.290 | 0.20 | | |
| 16 (Stop) | ∞ | Variable | | |
| 17* | 13.203 | 3.35 | 1.49700 | 81.54 |
| 18 | −5.267 | 0.30 | 1.85026 | 32.27 |
| 19 | −8.568 | Variable | | |
| 20 | −146.414 | 0.30 | 2.00069 | 25.46 |
| 21 | 3.956 | 2.56 | 1.51633 | 64.14 |
| 22 | 16.344 | 5.20 | | |
| 23 | 18.610 | 0.30 | 1.78800 | 47.37 |
| 24 | 9.192 | 3.15 | 2.00069 | 25.46 |
| 25 | −19.913 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane (Light receiving surface) | ∞ | | | |

Aspherical surface data

5th surface k = 0.000
A4 = 4.82463e−06, A6 = 6.24121e−08, A8 = 1.52374e−09,
A10 = 4.43258e−11

6th surface k = 0.000
A4 = −3.40987e−06, A6 = −3.46333e−08, A8 = 7.48512e−10,
A10 = 6.07917e−11

7th surface k = 0.000
A4 = −2.26288e−05, A6 = −1.85396e−07, A8 = −6.29694e−12

9th surface k = −0.584
A4 = 9.63695e−04, A6 = −1.35363e−05, A8 = 5.51676e−07

10th surface k = 0.000
A4 = 1.00835e−04, A6 = −7.08715e−06, A8 = 1.36140e−06

14th surface k = 1.951
A4 = −4.22670e−04, A6 = −9.35277e−06, A8 = 2.78772e−07

15th surface k = 25.729
A4 = −4.50452e−06, A6 = −6.11080e−06, A8 = 5.09284e−07

17th surface k = 0.433

A4 = −2.75465e−04, A6 = 4.07411e−06, A8 = 3.24230e−07

Various data

Image height 3.84

| | Wide angle | Inter mediate | Telephoto |
|---|---|---|---|
| Focal length | 5.11 | 15.40 | 48.86 |
| Fno. | 3.87 | 5.94 | 6.77 |
| Angle of field 2ω | 81.54 | 26.23 | 8.34 |
| BF (in air) | 1.72 | 1.72 | 1.72 |
| Lens total length (in air) | 68.14 | 68.14 | 68.14 |
| d8 | 1.00 | 9.49 | 15.58 |
| d13 | 15.04 | 6.55 | 0.46 |
| d16 | 6.65 | 3.17 | 2.62 |
| d19 | 4.00 | 7.48 | 8.13 |

Unit focal length f1 = 16.16  f2 = −5.00  f3 = 14.03  f4 = 14.82  f5 = 12.87

Example 4

Unit mm

Surface data

| Surface no. | r | d | nd | νd |
|---|---|---|---|---|
| Object plane | ∞ | ∞ | | |
| 1 | 86.203 | 0.30 | 2.00069 | 25.46 |
| 2 | 14.353 | 2.45 | | |
| 3 | ∞ | 12.00 | 1.90366 | 31.32 |
| 4 | ∞ | 0.21 | | |
| 5* | −225.129 | 1.57 | 1.74320 | 49.34 |
| 6* | −21.735 | 0.20 | | |
| 7* | 14.371 | 2.83 | 1.49700 | 81.54 |
| 8 | −43.962 | Variable | | |
| 9* | −8.095 | 0.30 | 1.90200 | 25.10 |
| 10* | 9.410 | 0.50 | | |
| 11 | 14.021 | 2.18 | 1.94595 | 17.98 |
| 12 | −7.657 | 0.30 | 1.88300 | 40.76 |
| 13 | 14.800 | Variable | | |
| 14* | 10.105 | 1.58 | 1.61881 | 63.85 |
| 15* | −62.641 | 0.20 | | |
| 16 (Stop) | ∞ | Variable | | |
| 17* | 14.907 | 3.00 | 1.49700 | 81.54 |
| 18 | −5.525 | 0.30 | 1.85026 | 32.27 |
| 19 | −8.743 | Variable | | |
| 20 | −90.671 | 0.30 | 2.00069 | 25.46 |
| 21 | 4.354 | 2.71 | 1.51633 | 64.14 |
| 22 | 57.220 | 5.60 | | |
| 23 | 26.403 | 0.30 | 1.78800 | 47.37 |
| 24 | 13.733 | 2.39 | 2.00178 | 19.32 |
| 25 | −21.497 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane (Light receiving surface) | ∞ | | | |

Aspherical surface data

5th surface k = 0.000
A4 = 5.90087e−06, A6 = 7.00893e−08, A8 = 1.31987e−09,
A10 = −7.21474e−12

-continued

Unit mm

6th surface k = 0.000
A4 = −5.54274e−06, A6 = −4.23044e−08, A8 = 1.28571e−09,
A10 = −1.27928e−24
7th surface k = 0.000
A4 = −2.64453e−05, A6 = −1.90221e−07, A8 = 2.12647e−11,
A10 = 7.84124e−26
9th surface k = −0.074
A4 = 7.53985e−04, A6 = 1.58730e−05, A8 = −6.16945e−07,
A10 = −9.09258e−26
10th surface k = 0.000
A4 = −2.14093e−04, A6 = 2.30259e−05, A8 = −2.91970e−07,
A10 = −3.68350e−25
14th surface k = 2.066
A4 = −3.91199e−04, A6 = −9.37348e−06, A8 = 1.38175e−07,
A10 = 1.93639e−26
15th surface k = 2.468
A4 = 4.07172e−05, A6 = −5.91157e−06, A8 = 4.03980e−07,
A10 = 2.56493e−26
17th surface k = −2.320
A4 = −1.67478e−04, A6 = 4.49663e−08, A8 = 3.31893e−07,
A10 = −5.84793e−25

Various data

|  | Wide angle | Inter mediate | Telephoto |
|---|---|---|---|
| Focal length | 5.11 | 15.64 | 48.95 |
| Fno. | 3.87 | 5.66 | 6.81 |
| Angle of field 2ω | 81.63 | 25.99 | 8.38 |
| BF (in air) | 1.73 | 1.73 | 1.73 |
| Lens total length (in air) | 68.11 | 68.11 | 68.11 |
| d8 | 1.00 | 9.54 | 15.54 |
| d13 | 15.00 | 6.46 | 0.46 |
| d16 | 6.95 | 3.21 | 2.61 |
| d19 | 4.21 | 7.95 | 8.55 |

Unit focal length

| f1 = 16.08 | f2 = −5.00 | f3 = 14.18 | f4 = 15.42 | f5 = 19.65 |

Example 5

Unit mm

Surface data

| Surface no. | r | d | nd | vd |
|---|---|---|---|---|
| Object plane | ∞ | ∞ | | |
| 1 | 98.339 | 0.30 | 2.00069 | 25.46 |
| 2 | 14.668 | 2.40 | | |
| 3 | ∞ | 12.00 | 1.90366 | 31.32 |
| 4 | ∞ | 0.21 | | |
| 5* | 442.709 | 1.66 | 1.74320 | 49.34 |
| 6* | −24.005 | 0.20 | | |
| 7* | 15.589 | 2.82 | 1.49700 | 81.54 |
| 8 | −38.264 | Variable | | |
| 9* | −8.027 | 0.30 | 1.90200 | 25.10 |
| 10* | 9.214 | 0.50 | | |
| 11 | 15.694 | 2.11 | 1.94595 | 17.98 |
| 12 | −7.437 | 0.30 | 1.88300 | 40.76 |
| 13 | 17.189 | Variable | | |
| 14* | 9.826 | 1.60 | 1.61881 | 63.85 |
| 15* | −84.216 | 0.20 | | |
| 16 (Stop) | ∞ | Variable | | |
| 17* | 14.854 | 3.21 | 1.49700 | 81.54 |
| 18 | −5.742 | 0.30 | 1.85026 | 32.27 |
| 19 | −9.004 | Variable | | |
| 20 | 39077.058 | 0.30 | 2.00069 | 25.46 |
| 21 | 4.115 | 2.70 | 1.51633 | 64.14 |
| 22 | 3241.397 | Variable | | |
| 23 | 186514.225 | 0.30 | 1.78800 | 47.37 |
| 24 | 16.119 | 2.47 | 2.00178 | 19.32 |
| 25 | −15.060 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane (Light receiving surface) | ∞ | | | |

Aspherical surface data

5th surface k = 0.000
A4 = 1.67654e−09, A6 = 6.17353e−08, A8 = 2.62787e−10
6th surface k = 0.000
A4 = −5.16768e−06, A6 = −3.96354e−08, A8 = 5.48982e−10
7th surface k = 0.000
A4 = −1.88077e−05, A6 = −1.66305e−07, A8 = −1.97775e−11
9th surface k = −0.069
A4 = 9.27949e−04, A6 = 1.89285e−05, A8 = −1.11075e−06
10th surface k = 0.000
A4 = −1.45359e−04, A6 = 3.54873e−05, A8 = −1.39886e−06
14th surface k = 1.878
A4 = −4.16168e−04, A6 = −1.07836e−05, A8 = 1.49279e−07
15th surface k = 11.259
A4 = 1.79543e−05, A6 = −7.76624e−06, A8 = 4.49549e−07
17th surface k = −2.122
A4 = −2.05340e−04, A6 = 2.36881e−08, A8 = 2.64529e−07

Various data

| Image height | 3.84 | | |
|---|---|---|---|
|  | Wide angle | Inter mediate | Telephoto |
| Focal length | 5.10 | 15.52 | 48.87 |
| Fno. | 3.87 | 5.64 | 6.79 |
| Angle of field 2ω | 81.82 | 26.29 | 8.45 |
| BF (in air) | 1.72 | 1.72 | 1.72 |
| Lens total length (in air) | 68.21 | 68.21 | 68.21 |
| d8 | 1.00 | 9.50 | 15.49 |
| d13 | 14.97 | 6.47 | 0.46 |
| d16 | 7.13 | 3.12 | 2.64 |
| d19 | 4.10 | 8.12 | 8.53 |
| d22 | 5.40 | 5.39 | 5.46 |

-continued

Unit mm

Unit focal length

| f1 = 16.01 | f2 = −4.99 | f3 = 14.31 | f4 = 15.54 |
|---|---|---|---|
| f5 = −8.48 | f6 = 12.71 | | |

Example 6

Unit mm

Surface data

| Surface no. | r | d | nd | vd |
|---|---|---|---|---|
| Object plane | ∞ | ∞ | | |
| 1 | 144.713 | 0.30 | 2.00069 | 25.46 |
| 2 | 15.373 | 2.40 | | |
| 3 | ∞ | 12.00 | 1.90366 | 31.32 |
| 4 | ∞ | 0.21 | | |
| 5* | −519.667 | 1.55 | 1.74320 | 49.34 |
| 6* | −21.983 | 0.20 | | |
| 7* | 14.351 | 2.87 | 1.49700 | 81.54 |
| 8 | −49.272 | Variable | | |
| 9* | −8.093 | 0.30 | 1.90200 | 25.10 |
| 10* | 9.069 | 0.50 | | |
| 11 | 13.804 | 2.16 | 1.94595 | 17.98 |
| 12 | −7.553 | 0.30 | 1.88300 | 40.76 |
| 13 | 15.001 | Variable | | |
| 14* | 10.069 | 1.59 | 1.61881 | 63.85 |
| 15* | −55.951 | 0.20 | | |
| 16 (Stop) | ∞ | Variable | | |
| 17* | 12.314 | 3.35 | 1.49700 | 81.54 |
| 18 | −5.221 | 0.30 | 1.85026 | 32.27 |
| 19 | −8.790 | Variable | | |
| 20 | −191.069 | 0.30 | 2.00069 | 25.46 |
| 21 | 4.058 | 2.56 | 1.51633 | 64.14 |
| 22 | 14.587 | Variable | | |
| 23 | 17.157 | 0.30 | 1.78800 | 47.37 |
| 24 | 8.163 | 3.15 | 2.00069 | 25.46 |
| 25 | −22.988 | 0.20 | | |
| 26 | ∞ | 0.50 | 1.54880 | 67.00 |
| 27 | ∞ | 0.50 | | |
| 28 | ∞ | 0.50 | 1.51680 | 64.20 |
| 29 | ∞ | 0.37 | | |
| Image plane (Light receiving surface) | ∞ | | | |

Aspherical surface data

5th surface k = 0.000
A4 = 4.08365e−06, A6 = 5.17406e−08, A8 = 2.22417e−10,
A10 = 2.12705e−11

6th surface k = 0.000
A4 = −4.32928e−06, A6 = −5.24774e−08, A8 = 6.55711e−11,
A10 = 2.94461e−11

7th surface k = 0.000
A4 = −2.29882e−05, A6 = −2.03046e−07, A8 = 1.91331e−10

9th surface k = −0.085
A4 = 1.03582e−03, A6 = −1.57510e−05, A8 = 7.51298e−07

10th surface k = 0.000
A4 = 3.10614e−05, A6 = −1.13333e−05, A8 = 1.58328e−06

-continued

Unit mm

14th surface k = 1.644
A4 = −3.84939e−04, A6 = −7.91870e−06, A8 = 1.71326e−07

15th surface k = 13.037
A4 = −5.27150e−06, A6 = −5.23820e−06, A8 = 3.46276e−07

17th surface k = 2.464
A4 = −3.91665e−04, A6 = 1.93076e−06, A8 = 3.20533e−07

Various data

Image height 3.84

| | Wide angle | Inter mediate | Telephoto |
|---|---|---|---|
| Focal length | 5.11 | 15.50 | 48.90 |
| Fno. | 3.86 | 5.67 | 6.78 |
| Angle of field 2ω | 81.54 | 25.79 | 8.34 |
| BF (in air) | 1.73 | 1.73 | 1.73 |
| Lens total length (in air) | 68.12 | 68.12 | 68.12 |
| d8 | 1.00 | 9.75 | 15.45 |
| d13 | 14.95 | 6.20 | 0.50 |
| d16 | 6.80 | 3.91 | 2.61 |
| d19 | 3.80 | 7.65 | 7.89 |
| d22 | 5.33 | 4.37 | 5.43 |

Unit focal length

| f1 = 16.08 | f2 = −4.97 | f3 = 13.92 | f4 = 14.89 |
|---|---|---|---|
| f5 = −5.97 | f6 = 9.09 | | |

Aberration diagrams at the time of the infinite object point focusing of the embodiment from the first embodiment to the sixth embodiment are shown in FIG. 7A to FIG. 12L. In these aberration diagrams, FIGS. 7A to 7D, FIGS. 8A to 8D, FIGS. 9A to 9D, FIGS. 10A to 10D, FIGS. 11A to 11D, and FIGS. 12A to 12D show a spherical aberration (SA), an astigmatism (AS), a distortion (DT), and a chromatic aberration of magnification (CC) respectively, at the wide angle end, FIGS. 7E TO 7H, FIGS. 8E TO 8H, FIGS. 9E TO 9H, FIGS. 10E TO 10H, FIGS. 11E TO 11H, and FIGS. 12E TO 12H show a spherical aberration (SA), an astigmatism (AS), a distortion (DT), and a chromatic aberration of magnification (CC) respectively, at the intermediate focal length state, and FIGS. 7I TO 7L, FIGS. 8I TO 8L, FIGS. 9I TO 9L, FIGS. 10I TO 10L, FIGS. 11I TO 11L and FIGS. 12I TO 12L show a spherical aberration (SA), an astigmatism (AS), a distortion (DT), and a chromatic aberration of magnification (CC) at the telephoto end. In each diagram, 'ω' shows a half image angle.

Next, parameter and values of conditional expressions in each embodiments are described.

| Conditional expression | Example 1 | Example 2 | Example 3 |
|---|---|---|---|
| (1) a | 5.01 | 5.75 | 5.73 |
| (2) b | −0.100 | −0.098 | −0.097 |
| (3) c-1 | 0.0061 | 0.0061 | 0.0061 |
| (4) c-2 | 0.0061 | 0.0061 | 0.0061 |
| (5) d-1 | 0.170 | 0.142 | 0.139 |
| (6) d-2 | 0.170 | 0.142 | 0.139 |
| (7) e | 0.087 | 0.094 | 0.090 |
| (8) f | 0.153 | 0.111 | 0.117 |
| (9) g | 0.135 | 0.123 | 0.095 |
| (10) l | 9.61 | 9.57 | 9.56 |

-continued

| | | | |
|---|---|---|---|
| (11) 2 | 1.33 | 1.33 | 1.33 |
| (12) AA | −0.11 | −0.10 | −0.10 |
| (13) 4 | 3.22 | 2.81 | 2.82 |
| (14) 3 | 30.73 | 32.20 | 32.20 |
| (15) E | 0.34 | 0.29 | 0.30 |
| (16) F | 0.54 | 0.63 | 0.64 |
| (17) 5A | 81.54 | 81.54 | 81.54 |
| (18) 5B | 50.81 | 49.34 | 49.34 |
| (19) A | 0.20 | 0.25 | 0.25 |

| Conditional expression | Example 4 | Example 5 | Example 6 |
|---|---|---|---|
| (1) a | 5.73 | 5.77 | 5.70 |
| (2) b | −0.098 | −0.097 | −0.096 |
| (3) c-1 | 0.0061 | 0.0061 | 0.0061 |
| (4) c-2 | 0.0061 | 0.0061 | 0.0061 |
| (5) d-1 | 0.138 | 0.142 | 0.139 |
| (6) d-2 | 0.138 | 0.142 | 0.139 |
| (7) e | 0.100 | 0.093 | 0.090 |
| (8) f | 0.111 | 0.111 | 0.117 |
| (9) g | 0.125 | 0.121 | 0.095 |
| (10) 1 | 9.58 | 9.59 | 9.57 |
| (11) 2 | 1.33 | 1.33 | 1.33 |
| (12) AA | −0.10 | −0.10 | −0.10 |
| (13) 4 | 2.82 | 2.82 | 2.81 |
| (14) 3 | 32.20 | 32.20 | 32.20 |
| (15) E | 0.29 | 0.29 | 0.29 |
| (16) F | 0.64 | 0.63 | 0.64 |
| (17) 5A | 81.54 | 81.54 | 81.54 |
| (18) 5B | 49.34 | 49.34 | 49.34 |
| (19) A | 0.25 | 0.25 | 0.25 |

(Correction of Distortion)

Incidentally, when the zoom lens system of the present invention is used, a digital correction of distortion of an image may be carried out electrically. A basic concept for the digital correction of the distortion of an image will be described below.

For example, the image heights in the wide angled end can be set to values smaller than the values in each embodiments described above when the correction of distortion is carried out. Moreover, the image heights in the intermediate state and the telephoto end can be set to that shown in each example described above. The correction of distortion is carried out on the basis of the shorter side. The effective image pickup area in the wide angled area has a barrel-shape, and the effective image pickup area is corrected to a rectangle shape by image processing. In the intermediate state and the telephoto end, the distortion having a bobbin-shape is corrected electrically so that the remained distortion is set to be 0%.

Figure 13:
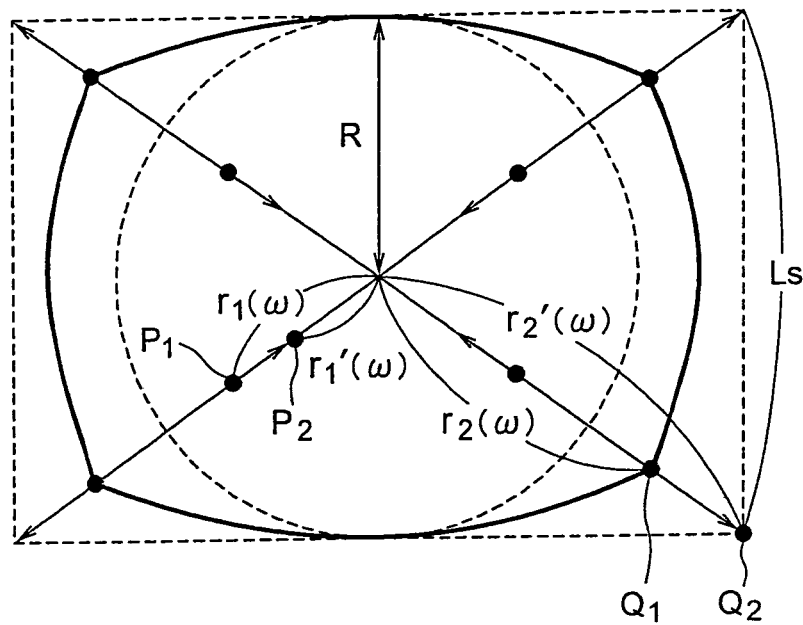
FIG. 13 illustrates correction of distortion.

For example, as shown in FIG. 13, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 13, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed in a direction away from the center of the circle.

Here, r'(ω) can be expressed as follows.

$$r'(\omega) = \alpha \cdot f \cdot \tan \omega$$

where, ω is a half image angle of an object, f is a focal length of an imaging optical system, and α satisfies $0 \leq \alpha \leq 1$.

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Further, the present invention could be applied to an electrical image pick up apparatus, especially a digital camera, video camera etc. in which the object image is formed by the above-mentioned zoom lens, then the object image is light-received such as CCD etc. Such embodiment will be described below.

Figure 14:
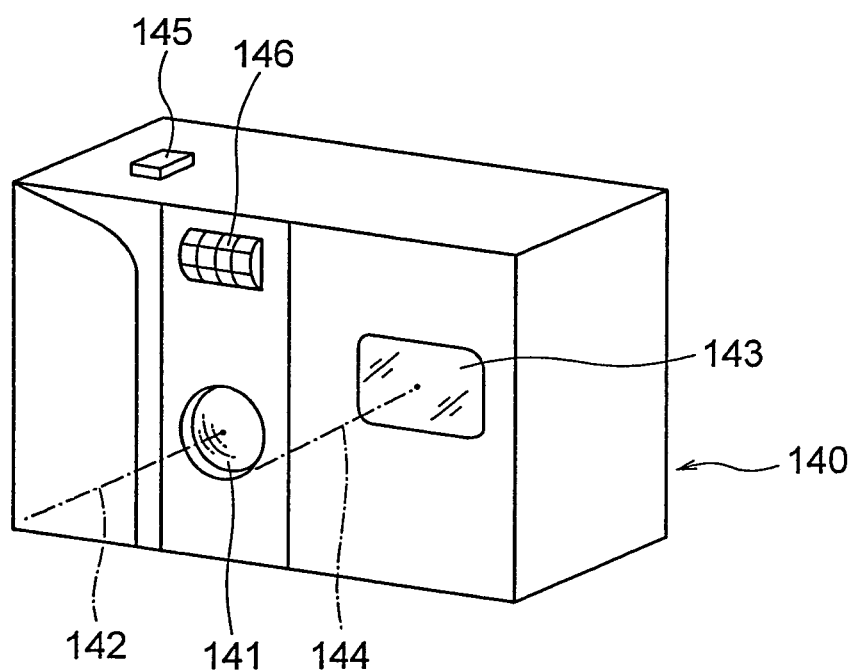
FIG. 14 is a front perspective view showing the outer appearance of a digital camera equipped with a zoom lens having a bent optical path according to the present invention.
Figure 15:
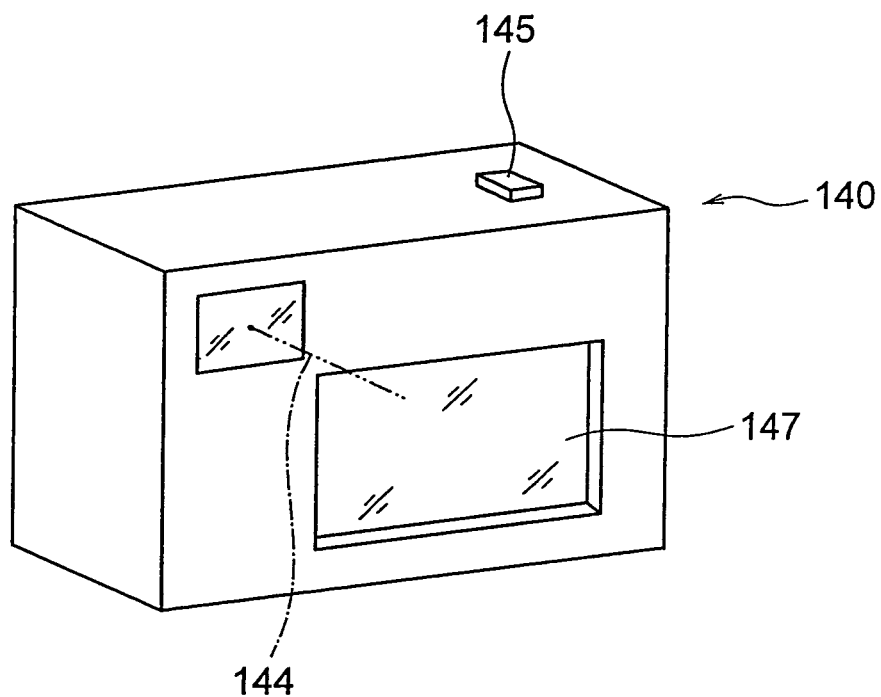
FIG. 15 is a rear perspective view of the digital camera.

FIG. 14 to FIG. 16 are conceptual diagrams of a structure of a digital camera according to the present invention in which a zoom lens system described above is incorporated in a taking optical system 141. FIG. 14 is a front perspective view showing an appearance of a digital camera 140, FIG. 15 is a rear perspective view of the same, and FIG. 16 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since, in the digital camera 140 structured in such manner, the taking optical system 141 has a high zoom ratio of 10 magnifications and the zoom lens has a high optical performance, it is possible to realize the high-performance inexpensive digital camera in which the depth is extremely thin.

Further, the example shown in FIG. 16, a plane parallel plate is disposed as the cover member 150. However, a lens having a power could be used. Furthermore, the cover member 150 could be omitted.

(Internal Circuit Structure)

Figure 17:
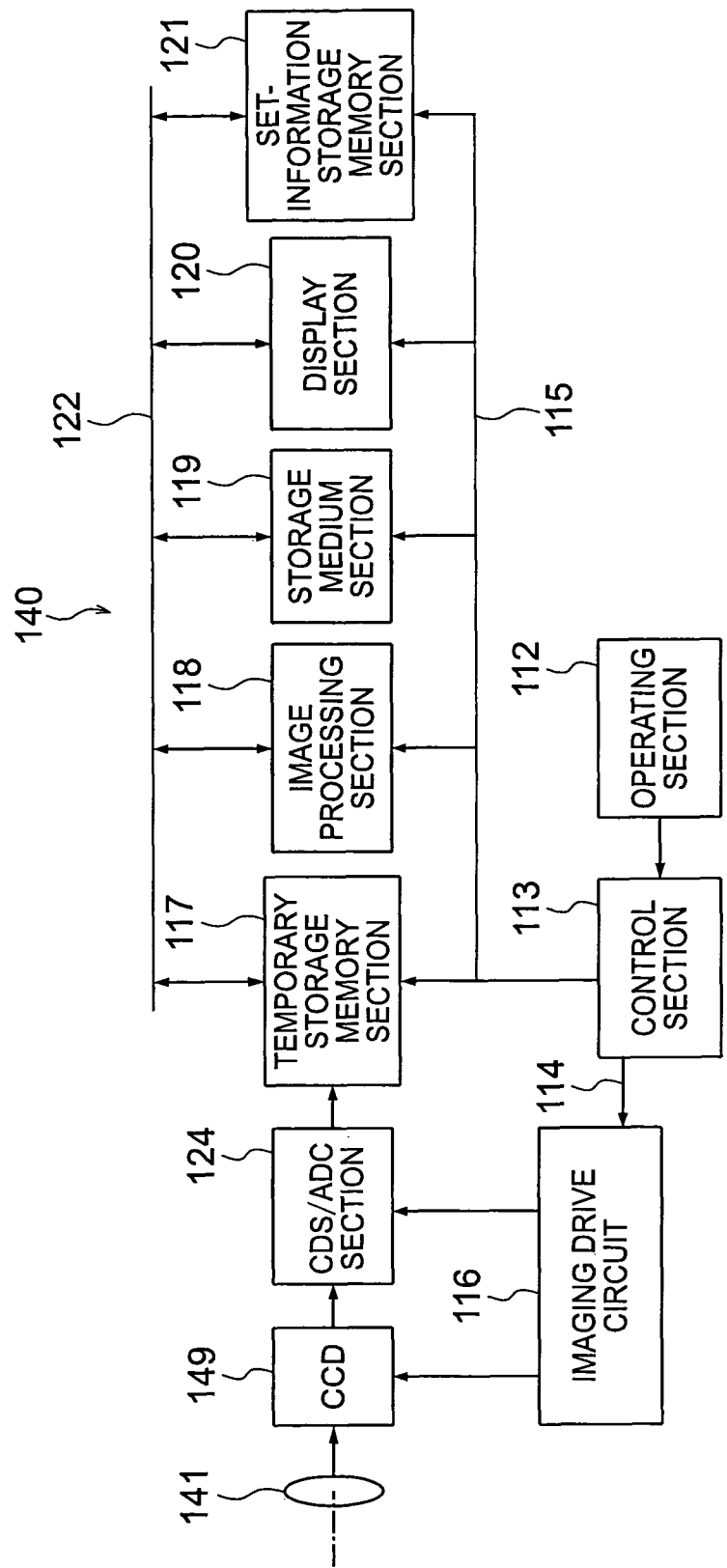
FIG. 17 is a block diagram showing the basic internal circuit configuration of the digital camera.

FIG. 17 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 17, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described above, the present invention can usefully applied to an image pickup apparatus equipped with a zoom lens having a reflecting member that deflects the optical path to thereby reduce the thickness of the image pickup apparatus.

What is claimed is:

1. An image pickup apparatus comprising:
a zoom lens; and
an image pickup element having an image pickup surface that converts an image formed by the zoom lens into an electrical signal,
wherein the zoom lens consists of, in order from the object side, a first lens unit having a positive refractive power in which a reflecting surface that deflects the optical path is provided, a second lens unit having a negative refractive power, and a rear lens unit having a positive refractive power,
wherein the rear lens unit comprises, in order from the object side, a third lens unit and a fourth lens unit,
wherein an aperture stop is provided between the second lens unit and the fourth lens unit,
wherein during zooming from the wide angle end to the telephoto end, the first lens unit is kept stationary, the second lens unit moves in such a way as to be located closer to the image side at the telephoto end than at the wide angle end, and the distances between the lens units change,
wherein the second lens unit comprises a plurality of negative lenses,
wherein the negative lens located closest to the object side among the plurality of negative lenses is a first negative lens, and
wherein the following conditional expressions (a), (b), and (c-1) are satisfied:

$$3.3 < \beta_{2T}/\beta_{2W} < 34 \quad \text{(a)},$$

$$-0.14 < f_{2G1N}/f_T < -0.001 \quad \text{(b), and}$$

$$0 < D_{2G1N}/f_T < 0.02 \quad \text{(c-1)},$$

where $\beta_{2T}$ is the lateral magnification of the second lens unit at the telephoto end, $\beta_{2W}$ is the lateral magnification of the second lens unit at the wide angle end, $f_{2G1N}$ is the focal length of the first negative lens in the second lens unit, $D_{2G1N}$ is the thickness of the first negative lens in the second lens unit on the optical axis, and $f_T$ is the focal length of the entire zoom lens system at the telephoto end.

2. The image pickup apparatus according to claim 1, wherein the second lens unit comprises a plurality of negative lenses, wherein the negative lens located closest to the image side among the negative lenses is a second negative lens, and wherein the following conditional expression (c-2) is satisfied:

$$0 < D_{2G2N}/f_T < 0.02 \quad \text{(c-2)},$$

where $D_{2G2N}$ is the thickness of the second negative lens in the second lens unit on the optical axis.

3. The image pickup apparatus according to claim 2, wherein the second lens unit comprises one or more positive lens elements provided between the first negative lens and the second negative lens, wherein the first negative lens is a biconcave lens, and wherein the second negative lens is a biconcave lens.

4. The image pickup apparatus according to claim 3, wherein the following conditional expression (d-1) is satisfied:

$$0 < D_{2G1N}/D_{2GP} < 0.3 \qquad (\text{d-1})$$

where $D_{2GP}$ is the thickness on the optical axis of the positive lens that has the largest thickness on the optical axis among the positive lenses in the second lens unit.

5. The image pickup apparatus according to claim 3, wherein the following conditional expression (d-2) is satisfied:

$$0 < D_{2G2N}/D_{2GP} < 0.3 \qquad (\text{d-2}),$$

where $D_{2GP}$ is the thickness on the optical axis of the positive lens that has the largest thickness on the optical axis among the positive lenses in the second lens unit.

6. The image pickup apparatus according to claim 1, wherein the fourth lens unit comprises one negative lens element and one positive lens element, and wherein the following conditional expression (e) is satisfied:

$$0 < D_{4GN}/D_{4GP} < 0.3 \qquad (\text{e}),$$

where $D_{4GN}$ is the thickness on the optical axis of the negative lens element that has the largest thickness on the optical axis among the negative lens elements in the fourth lens unit, and $D_{4GP}$ is the thickness on the optical axis of the positive lens element that has the largest thickness on the optical axis among the positive lens elements in the fourth lens unit.

7. The image pickup apparatus according to claim 6, wherein the fourth lens unit comprises a cemented lens made up of one or more positive lens elements and one or more negative lens elements that are cemented together.

8. The image pickup apparatus according to claim 1, wherein the rear lens unit comprises a fifth lens unit provided on the image side of the fourth lens unit, and wherein the distance between the fourth lens unit and the fifth lens unit changes during zooming from the wide angel end to the telephoto end.

9. The image pickup apparatus according to claim 8, wherein the fifth lens unit comprises one negative lens element and one positive lens element, and wherein the following conditional expression (f) is satisfied:

$$0 < D_{5GN}/D_{5GP} < 0.3 \qquad (\text{f}),$$

where $D_{5GN}$ is the thickness on the optical axis of the negative lens element that has the largest thickness on the optical axis among the negative lens elements in the fifth lens unit, and $D_{5GP}$ is the thickness on the optical axis of the positive lens element that has the largest thickness on the optical axis among the positive lens elements in the fifth lens unit.

10. The image pickup apparatus according to claim 9, wherein the fifth lens unit comprises two or less cemented lenses each made up of one or more positive lens elements and one or more negative lens elements.

11. The image pickup apparatus according to claim 8, wherein the rear lens unit comprises a sixth lens unit provided on the image side of the fifth lens unit, wherein the distance between the fifth lens unit and the sixth lens unit changes during zooming from the wide angle end to the telephoto end, wherein the sixth lens unit comprises one negative lens element and one positive lens element, and wherein the following conditional expression (g) is satisfied:

$$0 < D_{6GN}/D_{6GP} < 0.3 \qquad (\text{g})$$

where $D_{6GN}$ is the thickness on the optical axis of the negative lens element that has the largest thickness on the optical axis among the negative lens elements in the sixth lens unit, and $D_{6GP}$ is the thickness on the optical axis of the positive lens element that has the largest thickness on the optical axis among the positive lens elements in the sixth lens unit.

12. The image pickup apparatus according to claim 11, wherein the sixth lens unit comprises a cemented lens made up of one or more positive lens elements and one or more negative lens elements that are cemented together.

13. The image pickup apparatus according to claim 1, wherein the following conditional expressions (1), (2), and (AA) are satisfied:

$$7 < f_T/f_W < 30 \qquad (1),$$

$$0.5 < f_W/IH < 1.38 \qquad (2), \text{ and}$$

$$-0.2 < f_{2G}/f_T < -0.05 \qquad (\text{AA}),$$

where $f_W$ is the focal length of the entire zoom lens system at the wide angle end, IH is the largest image height in an effective image pickup area on the image pickup surface, and $f_{2G}$ is the focal length of the second lens unit.

14. The image pickup apparatus according to claim 1, wherein the following conditional expression (4) is satisfied:

$$1.8 < \Delta_{2G}/f_W < 15 \qquad (4)$$

where $\Delta_{2G}$ is the displacement of the position of the second lens unit at the telephoto end from the position of the second lens unit at the wide angle end with a displacement toward the image side being represented by a positive value.

15. The image pickup apparatus according to claim 1, wherein the first lens unit comprises, in order from the object side, a negative lens element, a reflecting member, and a rear sub lens unit, wherein the rear sub lens unit comprises a first positive lens and a second positive lens, and wherein the following conditional expression (3) is satisfied:

$$16.5 < |\nu_{dp1} - \nu_{dp2}| < 80 \qquad (3),$$

where $\nu_{dp1}$ is the Abbe constant of the first positive lens in the first lens unit with respect to the d-line defined by the equation $\nu_{dp1} = (n_{d1}-1)/(n_{F1}-n_{C1})$ with $n_{d1}$, $n_{C1}$, and $n_{F1}$ being the refractive indices of the first positive lens element with respect to the d-line, the C-line, and the F-line respectively, and $\nu_{dp2}$ is the Abbe constant of the second positive lens in the first lens unit with respect to the d-line defined by the equation $\nu_{dp2} = (n_{d2}-1)/(n_{F2}-n_{C2})$ with $n_{d2}$, $n_{C2}$, and $n_{F2}$ being the refractive indices of the second positive lens element with respect to the d-line, the C-line, and the F-line respectively.

16. The image pickup apparatus according to claim 15, wherein one of the first and second positive lenses satisfies the following conditional expression (5A) and the other of them satisfies the following conditional expression (5B):

$$\nu_{dpone} > 60 \qquad (5A), \text{ and}$$

$$\nu_{dpoth} < 60 \qquad (5B),$$

where $\nu_{dpone}$ is the Abbe constant of one of the first and second positive lenses with respect to the d-line defined by the equation $\nu_{dpone} = (n_{d3}-1)/(n_{F3}-n_{C3})$ with $n_{d3}$, $n_{F3}$, and $n_{C3}$ being the refractive indices of one of the first and second positive lenses with respect to the d-line, the F-line, and the C-line respectively, and $\nu_{dpoth}$ is the Abbe constant of the other of the first and second positive lenses with respect to the d-line defined by the equation $\nu_{dpoth} = (n_{d4}-1)/(n_{F4}-n_{C4})$ with $n_{d4}$, $n_{F4}$, and $n_{C4}$ being the refractive indices of the other of the first and second positive lenses respect to the d-line, the F-line, and the C-line respectively.

17. The image pickup apparatus according to claim 16, wherein the following conditional expression (A) is satisfied:

$$0.1 < n_{dp1} - n_{dp2} < 0.65 \qquad (A)$$

where $n_{dp1}$ is the refractive index with respect to the d-line of one of the first and second positive lenses that has an Abbe constant smaller than that of the other, and $n_{dp2}$ is the refractive index with respect to the d-line of the one of the first and second positive lenses that has an Abbe constant larger than that of the other.

18. The image pickup apparatus according to claim 1, wherein the rear lens unit comprises three or more lens units each having a positive refractive power.

19. The image pickup apparatus according to claim 18, wherein the rear lens unit comprises, in order from the object side, a third lens unit having a positive refractive power, a fourth lens unit having a positive refractive power, and a fifth lens unit having a positive refractive power, wherein the distances between the lens units change during zooming from the wide angle end to the telephoto end, and wherein the total number of the lens units is five.

20. The image pickup apparatus according to claim 1, wherein the first negative lens in the second lens unit has an aspheric surface.

21. The image pickup apparatus according to claim 1, wherein the following conditional expression (E) is satisfied:

$$0.05 < \Delta_{2G}/f_T < 0.4 \quad (E),$$

where $\Delta_{2G}$ is the displacement of the position of the second lens unit at the telephoto end from the position of the second lens unit at the wide angle end with a displacement toward the image side being represented by a positive value.

22. The image pickup apparatus according to claim 1, wherein the following conditional expression (F) is satisfied:

$$0.5 < \Sigma_{2G}/f_W < 1.0 \quad (F),$$

where $\Sigma_{2G}$ is the thickness of the second lens unit on the optical axis.

23. The image pickup apparatus according to claim 1, wherein the aperture stop is kept stationary during zooming from the wide angle end to the telephoto end.

24. The image pickup apparatus according to claim 1, wherein the third lens unit has a positive refractive power and is kept stationary during zooming from the wide angle end to the telephoto end, and wherein the aperture stop is kept stationary during zooming from the wide angle end to the telephoto end.

25. The image pickup apparatus according to claim 1, wherein the rear lens unit comprises a third lens unit having a positive refractive power, a fourth lens unit having a positive refractive power, a fifth lens unit having a negative refractive power provided on the image side of the fourth lens unit, and a sixth lens unit having a positive refractive power provided on the image side of the fifth lens unit, and wherein the distances between the lens units change during zooming from the wide angle end to the telephoto end.

26. The image pickup apparatus according to claim 1, wherein the third lens unit has a positive refractive power, the fourth lens unit has a positive refractive power, the third lens unit is kept stationary during zooming from the wide angle end to the telephoto end, the aperture stop is kept stationary during zooming from the wide angle end to the telephoto end, and the fourth lens unit moves along the optical axis during zooming from the wide angle end to the telephoto end.

27. The image pickup apparatus according to claim 26, wherein the rear lens unit comprises a fifth lens unit having a negative refractive power provided on the image side of the fourth lens unit, and wherein the fifth lens unit is kept stationary during zooming from the wide angle end to the telephoto end.

28. The image pickup apparatus according to claim 26, wherein the rear lens unit comprises a fifth lens unit having a negative refractive power provided on the image side of the fourth lens unit and a sixth lens unit having a negative refractive power provided on the image side of the fifth lens unit, wherein the distance between the fifth lens unit and the sixth lens unit changes during zooming from the wide angle end to the telephoto end, and wherein the fifth lens unit moves during focusing.

29. The image pickup apparatus according to claim 1 further comprising an image transformation section that transforms, by image processing, an electrical signal representing an image having distortion attributed to the zoom lens into an image signal representing an image that is corrected in terms of distortion.

* * * * *